United States Patent
Ragland et al.

(10) Patent No.: US 10,579,125 B2
(45) Date of Patent: Mar. 3, 2020

(54) PROCESSORS, METHODS, AND SYSTEMS TO ADJUST MAXIMUM CLOCK FREQUENCIES BASED ON INSTRUCTION TYPE

(71) Applicant: Intel Corporation, Santa Clara, CA (US)

(72) Inventors: Daniel J. Ragland, Hillsboro, OR (US); Pavithra Sampath, Shrewsbury, MA (US); Kirk Pfaender, Hillsboro, OR (US); Kahraman D. Akdemir, Santa Clara, CA (US); Ariel Gur, Atlit (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/055,578

(22) Filed: Feb. 27, 2016

(65) Prior Publication Data

US 2017/0249000 A1  Aug. 31, 2017

(51) Int. Cl.
*G06F 1/324* (2019.01)
*G06F 9/30* (2018.01)

(52) U.S. Cl.
CPC ............ *G06F 1/324* (2013.01); *G06F 9/3016* (2013.01); *G06F 9/30036* (2013.01)

(58) Field of Classification Search
CPC ............ Y02B 60/1217; Y02B 60/1285; Y02B 60/1221; Y02B 60/1282; G06F 1/324; G06F 9/30036; G06F 9/3016; Y02D 10/126

See application file for complete search history.

(56) References Cited

U.S. PATENT DOCUMENTS

| | | | |
|---|---|---|---|
| 5,638,525 A | * | 6/1997 | Hammond .......... G06F 9/30043 712/209 |
| 6,385,735 B1 | | 5/2002 | Wilson et al. |
| 7,257,729 B2 | | 8/2007 | Lee et al. |
| 7,624,295 B2 | | 11/2009 | Taketoshi et al. |
| 7,779,237 B2 | | 8/2010 | Correale, Jr. et al. |
| 8,527,801 B2 | | 9/2013 | Brock et al. |
| 8,943,334 B2 | | 1/2015 | Kumar et al. |
| 8,984,305 B2 | | 3/2015 | Distefano et al. |
| 9,032,126 B2 | | 5/2015 | Guddeti et al. |
| 9,086,823 B2 | | 7/2015 | Werner |
| 9,087,146 B2 | | 7/2015 | Rusu et al. |
| 9,235,244 B2 | | 1/2016 | Bhandaru et al. |
| 9,261,934 B2 | | 2/2016 | Uan-Zo-Li |
| 9,292,068 B2 | | 3/2016 | Ananthakrishnan et al. |

(Continued)

OTHER PUBLICATIONS

Intel, "Intel and Core i7 (Nehalem) Dynamic Power Management", 2008, 11 pages.

(Continued)

*Primary Examiner* — Terrell S Johnson
(74) *Attorney, Agent, or Firm* — NDWE, LLP

(57) ABSTRACT

An integrated circuit of an aspect includes a power control unit having an interface to receive an indication that one or more instructions of a first type are to be performed by a core. The power control unit also has logic to control a maximum clock frequency for the core based on the indication that the instructions of the first type are to be performed by the core.

24 Claims, 16 Drawing Sheets

(56) References Cited

U.S. PATENT DOCUMENTS

| | | | |
|---|---|---|---|
| 2003/0065960 A1* | 4/2003 | Rusu | G06F 1/3203 |
| | | | 713/300 |
| 2005/0071705 A1* | 3/2005 | Bruno | G06F 1/206 |
| | | | 713/500 |
| 2009/0019265 A1* | 1/2009 | Correale, Jr. | G06F 1/3203 |
| | | | 712/216 |
| 2011/0258477 A1* | 10/2011 | Baker | G06F 1/3203 |
| | | | 713/600 |
| 2012/0297232 A1 | 11/2012 | Bircher | |
| 2013/0047011 A1* | 2/2013 | Dice | G06F 9/485 |
| | | | 713/320 |
| 2014/0025930 A1* | 1/2014 | Lee | G06F 12/084 |
| | | | 712/205 |
| 2014/0136823 A1 | 5/2014 | Ragland et al. | |
| 2014/0337646 A1* | 11/2014 | Varma | G06F 1/3206 |
| | | | 713/322 |
| 2015/0346809 A1* | 12/2015 | Kumar | G06F 1/3293 |
| | | | 713/323 |
| 2016/0350156 A1* | 12/2016 | Lo | G06F 9/505 |

OTHER PUBLICATIONS

International Preliminary Report on Patentability for Application No. PCT/US2017/015370, dated Sep. 7, 2018, 14 pages.
International Search Report and Written Opinion for Application No. PCT/US2017/015370, dated May 4, 2017, 15 pages.

\* cited by examiner

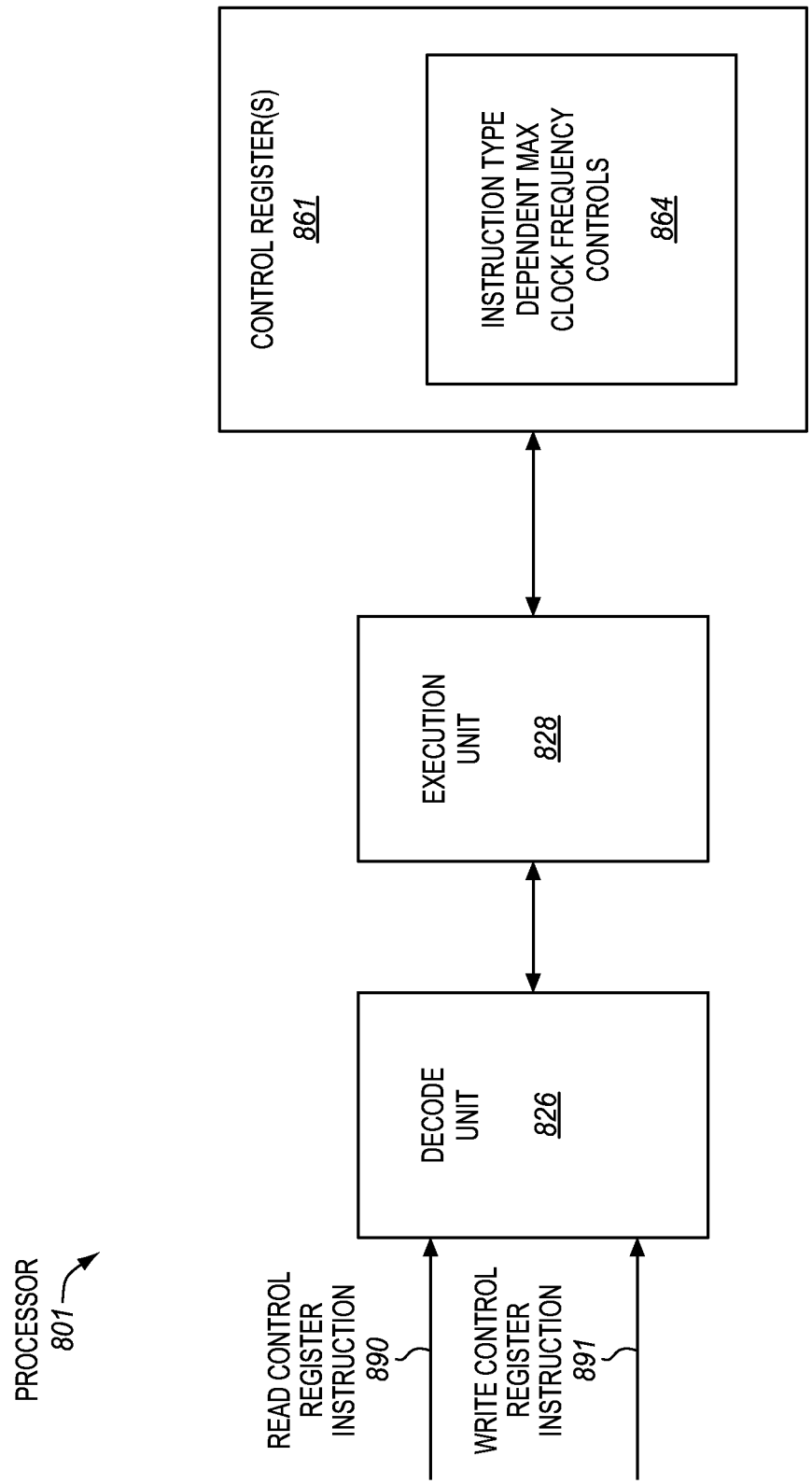

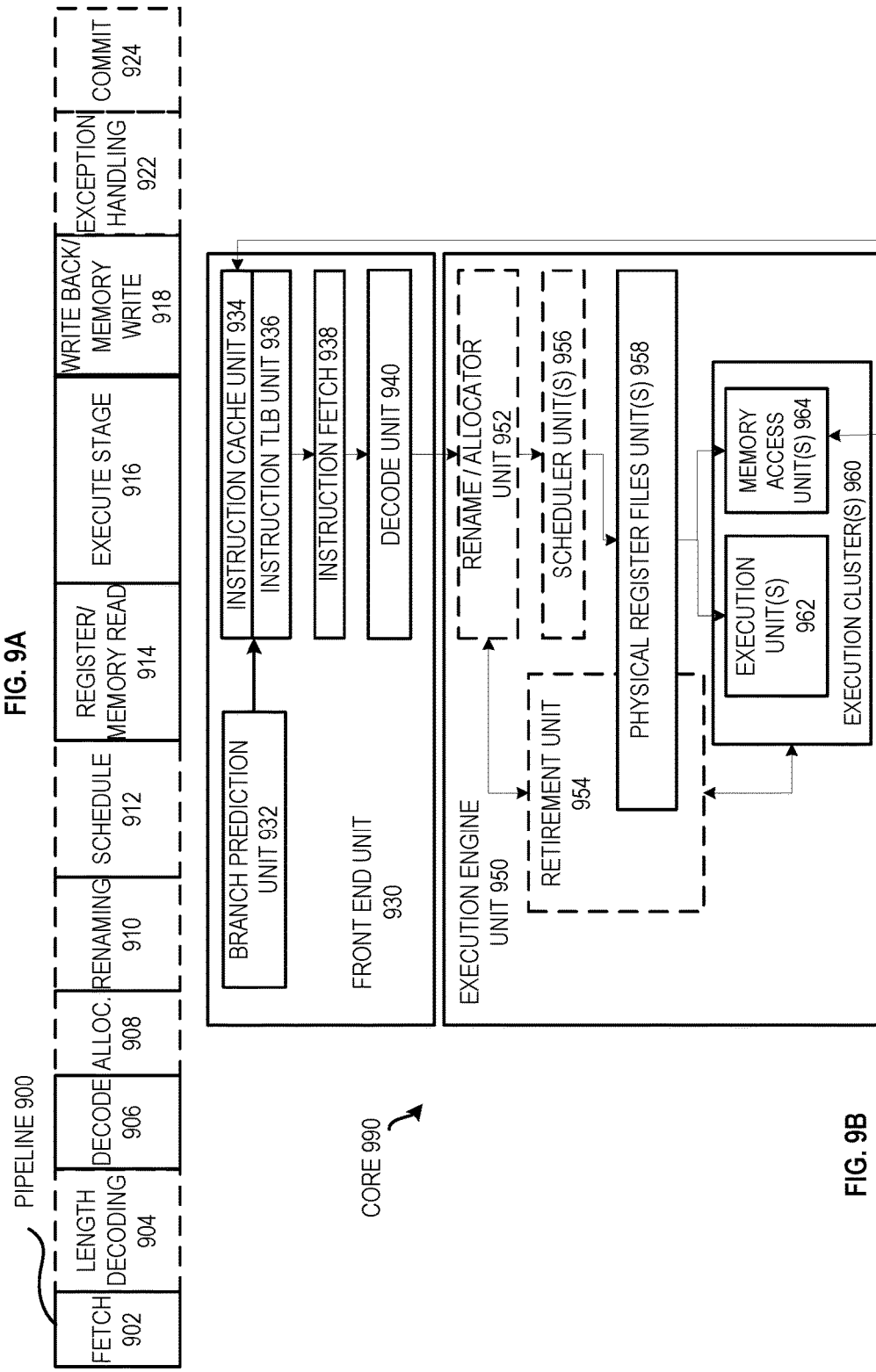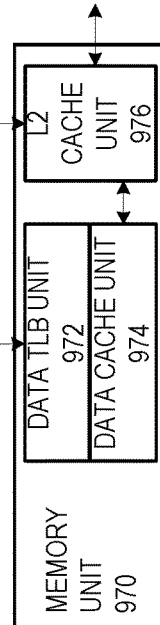

PROCESSORS, METHODS, AND SYSTEMS TO ADJUST MAXIMUM CLOCK FREQUENCIES BASED ON INSTRUCTION TYPE

BACKGROUND

Technical Field

Embodiments described herein generally relate to processors. In particular, embodiments described herein generally relate to adjusting clock frequencies in such processors.

Background Information

Processors and other integrated circuits are often driven by clock signals. The clock signals are characterized by frequencies. The frequencies of the clock signals may be varied over time. For example, the frequencies may be increased when greater performance is needed, or reduced to conserve power.

BRIEF DESCRIPTION OF THE DRAWINGS

The invention may best be understood by referring to the following description and accompanying drawings that are used to illustrate embodiments. In the drawings:

FIG. 8 is a block diagram of an embodiment of a processor that is operative to allow software to access instruction type dependent maximum clock frequency controls in one or more control registers.

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

DETAILED DESCRIPTION OF EMBODIMENTS

Disclosed herein in part are integrated circuits to adjust maximum clock frequencies based on instruction type, methods of adjusting maximum clock frequencies based on instruction type, and systems incorporating one or more integrated circuits to adjust maximum clock frequencies based on instruction type. Also disclosed herein in part are integrated circuits to allow software configuration of maximum clock frequencies based on instruction type, methods of software configuration of maximum clock frequencies based on instruction type, and systems incorporating one or more integrated circuits to allow software configuration of maximum clock frequencies based on instruction type. In the following description, numerous specific details are set forth (e.g., specific processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
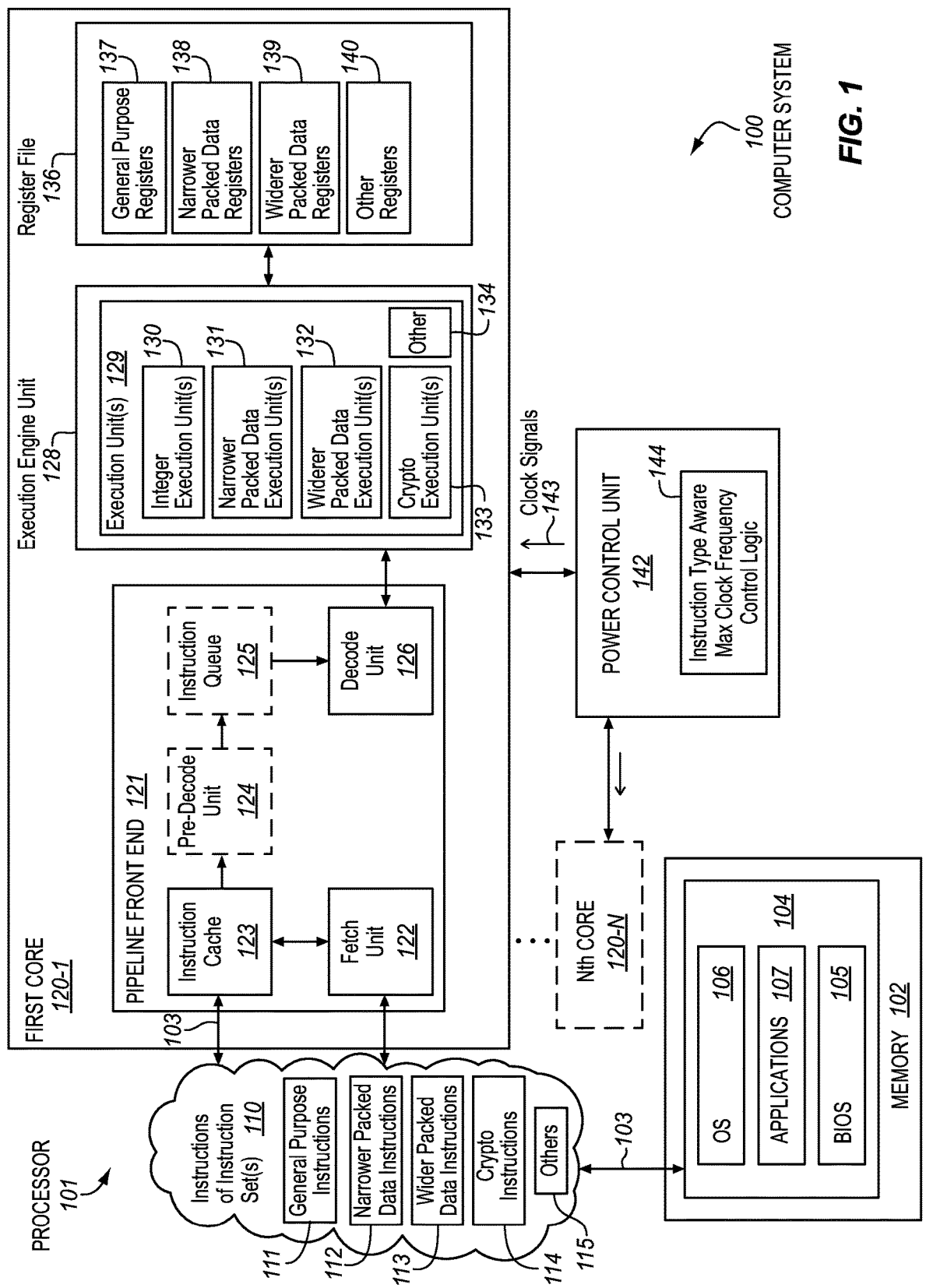
FIG. 1 is a block diagram of an embodiment of a computer system in which embodiments of the invention may be implemented.

FIG. 1 is a block diagram of an embodiment of a computer system 100 in which embodiments of the invention may be implemented. In various embodiments, the computer system may represent a desktop computer, a laptop computer, a notebook computer, a tablet computer, a netbook, a smartphone, a cellular phone, a server, a network device (e.g., a router, switch, etc.), a media player, a smart television, a nettop, a set-top box, a video game controller, or other type of electronic device.

The computer system includes a processor 101 and a memory 102. The memory may include one or more different memory devices and/or one or more different types of memory devices (e.g., dynamic random access memory (DRAM), flash, read only memory (ROM), persistent memory, or the like, or various combinations thereof). The processor and the memory are coupled, or otherwise in communication with one another, by a conventional coupling mechanism 103 (e.g., through one or more buses, hubs, memory controllers, chipset components, or the like).

Software 104 may be stored in the memory 102. The software may include, for example, a basic input/output system (BIOS) 105, one or more operating systems (OS) 106, and one or more user-level applications 107. During operation, portions of the software (e.g., instruction sequences) may be loaded into the processor, and performed by the processor. The instructions of the software may include instructions of an instruction set of the processor. The instructions of the instruction set may represent macroinstructions, machine-language instructions, machine code instructions, assembly language instructions, or other relatively low-level instructions that the processor is natively able to perform, as opposed to higher level language instructions.

Referring again to FIG. 1, instructions 110 of the instruction set may be fetched, loaded, or otherwise received into the processor. The instruction set may include various different types of instructions (e.g., to perform various different types of operations). As shown, for example, these instructions may include various different types of general-purpose arithmetic and/or logical instructions 111 (e.g., add, multiply, multiply-add, shift, logical AND, exclusive-OR, etc.). These instructions may also include various different types of packed data arithmetic and/or logical instructions 112, 113 (e.g., packed data add, packed data multiply, packed data multiply-add, packed data shift, packed data logical AND, packed data exclusive-OR, packed data rearrangement, etc.). Such packed data instructions are also sometimes referred to in the arts as vector instructions and/or Single Instruction, Multiple Data (SIMD) instructions). A packed data instruction, vector instruction, or SIMD instruction may operate on multiple data elements or multiple pairs of data elements simultaneously or in parallel. The processor may have parallel execution hardware responsive to the packed data instruction to perform the multiple operations simultaneously or in parallel. Multiple data elements may be packed within one register or memory location as packed data or vector data. In packed data, the bits of the register or other storage location may be logically divided into a sequence of data elements. For example, a 128-bit wide packed data register may have four 32-bit data elements, a 512-bit wide packed data register may have sixteen 32-bit data elements, etc.

As shown, often there may be packed data instructions of varying widths, for example, relatively narrower packed data instructions 112 (e.g., which may operate on operands of a given bit width), and relatively wider packed data instructions 113 (e.g., which may operate on operands of greater width than the given bit width). As used herein, the terms narrower and wider are relative terms (not absolute terms) and are relative to one another (i.e., the narrower widths are narrower than the wider widths). By way of example, certain Intel® 64 and IA-32 architecture compatible processors have MMX™ instructions, Streaming SIMD Extensions (SSE) instructions, and Advanced Vector Extensions (AVX) instructions. Legacy MMX™ instructions are designed to operate on 64-bit packed data operands or registers. The SSE instructions include the original SSE instructions and further extensions released over time which are known as the SSE2, SSE3, SSE4, SSE4.1, and SSE4.2 instructions. The original SSE instructions and certain other older SSE instructions are primarily designed to operate on 128-bit packed data operands or registers, whereas certain newer SSE instructions are designed to operate on 256-bit packed data operands or registers. The AVX instructions include AVX instructions, AVX2 instructions, and AVX-512 instructions. The AVX-512 instructions are sometimes referred to as AVX-512 instructions. The AVX and AVX2 instructions are able to operate on 256-bit packed data operands or registers. The AVX-512 instructions are able to operate on 512-bit packed data operands or registers. Various other instruction set architectures similarly have narrower packed data instructions and wider packed data instructions.

Referring again to FIG. 1, the instructions 110 may also include one or more different types of cryptographic instructions 114. For example, there may be one or more instructions to accelerate an encryption algorithm (e.g., one or more Advanced Encryption Standard (AES) acceleration instructions. As another example, there may be one or more instructions to accelerate a hash algorithm (e.g., one or more SHA-1 (Secure Hash Algorithm 1) acceleration instructions and/or one or more SHA-2 (Secure Hash Algorithm 2) acceleration instructions. There may also be other cryptographic instructions to accelerate other known cryptographic algorithms. As further shown, there may also be various other different types of instructions 115, such as, for example, instructions to support transactional memory, virtualization, secure enclaves, etc. Commonly the instruction set to have anywhere from many tens to many hundreds of different types of instructions. These different types of instructions may have various different types of operations with varying levels of complexity, completion times, amounts of implementation logic, and power consumptions incurred.

The processor 101 may receive these instructions 110 of the instruction set and is operative to perform these instructions. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

The processor has at least a first core 120-1 and may optionally have zero or more additional cores up through an optional Nth core 120-N, where the number of cores may represent any number desired for the particular implementation (e.g., 1, 2, 4, 7, 24, 30, more than 30, etc.). The first core 120-1 includes a pipeline front end 121. The pipeline front end may include various different combinations and arrangements of front end units or components depending upon the particular processor design. In the illustrated example embodiment, the pipeline front end includes an instruction fetch unit 122, an instruction cache 123 coupled with the instruction fetch unit, an optional pre-decode unit 124 coupled with the instruction cache, an optional instruction queue 125 coupled with the pre-decode unit, and a decode unit 126 coupled with the instruction queue. The fetch unit may fetch instructions from the memory into the instruction cache which may cache the instructions. The pre-decode unit may inspect at least a portion of the instructions and pre-decode of the instructions (e.g., examine a prefix or other instruction information and estimate an instruction length). The instruction queue may queue or store instructions prior to their delivery to the decode unit. The decode unit may receive and decode the instructions (e.g., by examining an opcode and/or potentially other fields of the instruction). The decode unit may output one or more relatively lower-level instructions or control signals (e.g., one or more microinstructions, micro-operations, microcode entry points, decoded instructions or control signals, etc.), which reflect, represent, and/or are derived from the relatively higher-level instructions that were received. The decode unit may be implemented using various different mechanisms including, but not limited to, microcode read only memories (ROMs), look-up tables, hardware implementations, programmable logic arrays (PLAs), and other mechanisms suitable to implement decode units. While a single decode unit is shown, multiple decode units may optionally be included. Other embodiments of pipeline front ends may include fewer or more components.

Referring again to FIG. 1, an execution engine unit 128 is coupled with the output of the decode unit 126 and/or the pipeline front end. The execution engine unit may include one or more execution unit(s) 129. As shown in the illustrated example embodiment, the execution engine unit and/or the processor may include one or more integer execution unit(s) 130 (e.g., to execute or perform the general-purpose instructions 111), one or more narrower packed data execution unit(s) 131 (e.g., to execute or perform the narrower packed data instructions 112), one or more wider packed data execution unit(s) 132 (e.g., to execute or perform the wider packed data instructions 113), optionally one or more cryptographic execution units 133 (e.g., to execute or perform the cryptographic instructions 114), and optionally one or more other execution unit(s) 134 (e.g., an address translation unit, a load and/or store unit, etc.). Alternatively, the processor may include fewer, more, and/or different types of execution units. The execution unit(s) may receive the decoded or otherwise converted instructions or control signals that represent and/or are derived from the instructions of the instruction set. The execution unit(s) may be operative in response to and/or as a result of the instructions of the instruction set (e.g., in response to the decoded instructions or control signals) to execute, perform, or implement the operations prescribed by the instructions of the instruction set.

Referring again to FIG. 1, the execution unit(s) 129 may be coupled with a register file 136. The register file may include various different types of registers. Each of the registers may represent an on-die storage location that is operative to store data. The registers may represent architecturally-visible or architectural registers that are visible to software and/or a programmer and/or are the registers indicated by instructions of the instruction set of the processor to identify operands. The registers may be implemented in different ways in different microarchitectures and are not limited to any particular type of design. Examples of suitable types of registers include, but are not limited to, dedicated physical registers, dynamically allocated physical registers using register renaming, and combinations thereof. Most of the instructions 110 may specify or otherwise indicate register(s) of the register file, and the execution unit(s) when performing those instructions may receive data from and/or store data to the register file, as prescribed by the instructions. As shown in the illustrated example embodiment, the register file may include a set of general-purpose registers 137 (e.g., which may be used when performing the general-purpose instructions 111), a set of narrower packed data registers 138 (e.g., which may be used when performing the narrower packed data instructions 112), a set of wider packed data registers 139 (e.g., which may be used when performing the wider packed data instructions 113), and optionally other registers (e.g., a status register, memory addressing register(s), etc.). As previously mentioned, the wider packed data registers may be relatively wider than the narrower packed data registers. For example, a 256-bit or 512-bit register may be wider than a 128-bit register.

Referring again to FIG. 1, a power control unit 142 is coupled with the first core 120-1, and each of the other optional cores including the Nth core 120-N. In some embodiments, the power control unit may be included on the same die or chip as the core(s) (e.g., both may be included in a same processor and/or on a same system on chip (SoC)). In other embodiments, the power control unit may be included on a die or chip separate from a die or chip having the core(s) (e.g., the cores may be included on a processor while the power control unit may be included on a separate chipset component). The power control unit may include power control and/or management logic to control and/or manage power for the core(s) and other components of the processor and/or computer system. In some embodiments, the power control unit may control, or at least assist with controlling, frequencies of clock signals 143 provided to the core(s). In some embodiments, the power control unit may be operative to implement clock frequency changing algorithms, such as, for example, Advanced Configuration and Power Interface (ACPI) states, dynamic overclocking (e.g., Intel® Turbo Boost Technology), and the like. The illustrated power control unit 142 includes an embodiment of instruction type aware maximum clock frequency control logic 144. Further optional details of the instruction type aware clock frequency control logic will be discussed further below.

Figure 2:
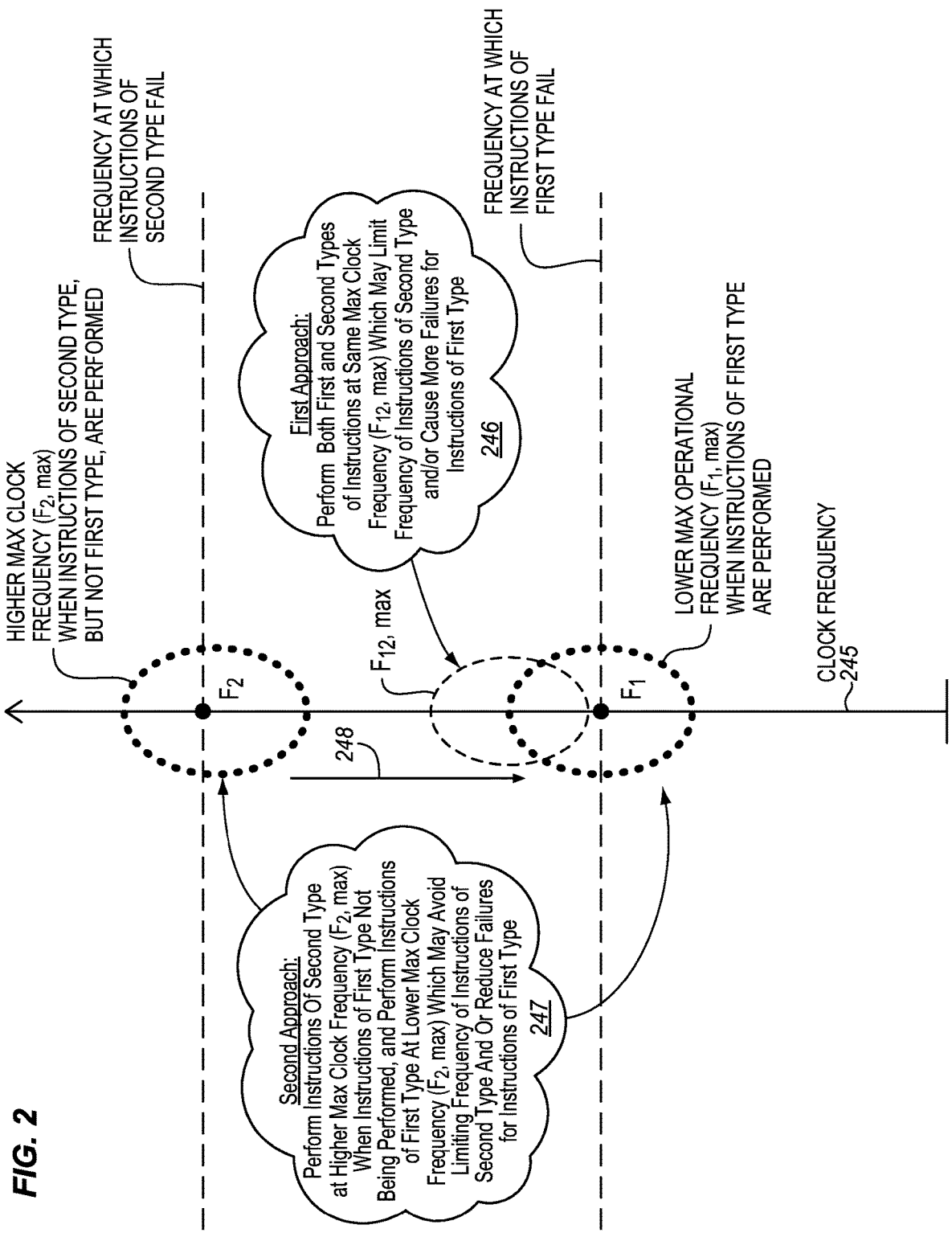
FIG. 2 is a diagram illustrating that different types of instructions may have different failure point clock frequencies, and contrasting two different possible approaches for controlling maximum clock frequencies for such instructions.

FIG. 2 is a diagram illustrating that different types of instructions may have different failure point clock frequencies, and contrasting two different possible approaches to control maximum clock frequencies for such instructions. Clock frequency 245 is plotted on a vertical axis with increasing magnitude from bottom to top.

A first lower failure point clock frequency (F1) represents a frequency around and above which instructions of a first type may tend to fail. Similarly, a second higher failure point clock frequency (F2) represents a frequency around and above which instructions of a second different type may tend to fail. As used herein, the terms lower and higher are used as relative terms (i.e., relative to one another) not absolute terms. Generally, it may be possible to perform instructions of the second type at frequencies below and up to around F2 without an unacceptable rate and/or level of failures, but if instructions of the second type are performed at frequencies above F2, and especially significantly above F2, the rate and/or level of failures may tend to be unacceptably high for at least some implementations. Similarly, it may be possible to perform instructions of the first type at frequencies below and up to around F1 without an unacceptable rate and/or level of failures, but if instructions of the first type are performed at frequencies above F1, and especially significantly above F2, the rate and/or level of failures may tend to be unacceptably high for at least some implementations.

In this context, "failure" is a generic term to represent the frequencies at which reliable operation is not possible. When tuning for higher performance it is common to find the failing point and then back down the frequency until a point of stability is reached. The failures may represent any of various different types of events or conditions leading to likelihood of system crashes (e.g., blue screen events), system instability or malfunctioning, instructions having erroneous behavior and/or leading to erroneous results, potentially silent data corruption, or the like. Typically the failures are those that can be recovered by a reboot as opposed to permanent hardware failures. Without wishing to be bound by theory, such failures could potentially occur due in part to various events or conditions associated with physical limits on operating circuitry at such high frequencies, propagating signals at such high frequencies, speed path limits at such high frequencies, thermal limits, power delivery limits, clock distribution limits, or the like, or various combinations thereof. In any event, regardless of the particular causes, it may be observable and/or detectable (e.g., through stress tests, torture tests, tuning, etc.) that as frequency is increased a distinctive or characteristic point or frequency range may be detected at which the rate of failures increases and/or becomes significant. There may not necessarily be a precise or discrete frequency above which instructions of a given type fail, and below which they do not fail. Rather, these failure point clock frequencies may represent points where or around which failures start to be detected, were failure rates meet a threshold level desired for the particular implementation, where the rate of failures begins to accelerate significantly, or the like.

Different failure point clock frequencies and/or different stable maximum operational clock frequencies for different types of instructions may be readily determined empirically and/or through routine testing. For example, stress tests, torture tests, other tests, validation studies, tuning studies, functional correctness studies, simulations, collecting historical data, or the like, may be used. Often, a test may involve running the processor on a given workload for a time period (e.g., from several to many hours) over a range of different frequencies encompassing a suspected failure point clock frequency, detecting failures and their times, and analyzing the results to estimate failure point clock frequencies and/or different stable maximum operational clock frequencies.

To further illustrate, as one specific non-limiting example, it has been observed that SSE instructions tend to have a higher stable maximum clock frequency on average than AVX1 and AVX2 instructions. Likewise, AVX1 and AVX2 instructions tend to have a higher stable maximum clock frequency on average than AVX-512 instructions. Accordingly, if AVX1 and/or AVX2 instructions are performed at the higher stable maximum clock frequencies appropriate for SSE, this may tend to lead to higher failure rates/levels than if SSE instructions were performed at these frequencies. Similarly, if AVX-512 instructions are performed at the higher stable maximum operational clock frequencies appropriate for AVX1 and/or AVX2, this may tend to lead to higher failure rates/levels than if AVX1 and/or AVX2 instructions were performed at these frequencies. By way of example, for certain processors, the SSE instructions may have on the order of around a 100-200 MHz higher maximum stable operational clock frequency than the AVX1/AVX2 instructions, and the AVX1/AVX2 instructions may have on the order of around a 100-200 MHz higher maximum stable operational clock frequency than the AVX-512 instructions. The precise values may depend upon the particular processor generation and other factors.

It is to be appreciated that, while SSE and AVX instructions are often used in the present disclosure to illustrate certain concepts, the scope of the invention is not so limited. Various other different types of instructions may similarly have different maximum stable operational clock frequencies to a greater or lesser degree. For example, it is contemplated that this may be the case for: (1) instructions with different SIMD widths (e.g., narrower SIMD instructions and wider SIMD instructions); (2) instructions with different levels of complexity (e.g., numbers of operations performed, time to complete, etc.) such as cryptographic instructions and non-cryptographic instructions; (3) instructions that use different amounts of logic in their implementation (e.g., different numbers of transistors); and (4) instructions that consume different amounts of power in their implementation. Accordingly, in these examples, the SSE, AVX1/AVX2, and AVX-512 instructions may broadly be regarded as a set of one or more instructions of a first type, a set of one or more instructions of a second different type, and set of one or more instructions of a third still different type.

Referring again to FIG. 2, two different possible approaches for controlling maximum clock frequencies for different types of instructions with different failure point clock frequencies are shown. According to a first approach, shown generally at first cloud 246, both the first and second types of instructions may be performed within, subject to, not above, or otherwise up to but substantially not exceeding the same single maximum clock frequency (F12,max). One possible drawback with this first approach is that generally the single maximum clock frequency (F12,max) needs to be limited by, and proximate to, or at least not too far above, the lower failure point clock frequency (F1) corresponding to instructions of the first type. The frequency that can be used successfully may generally be limited to some extent by the "weakest link" meaning the instruction(s) with the lower failure point clock frequency. If this is not done, more failures may tend to occur (e.g., more frequent system crashes, an inferior user experience, possible data corruption, etc.). Another possible drawback with this first approach is that some performance may be sacrificed when performing the instructions of the second type limited by the relatively lower single maximum clock frequency (F12,max) instead of allowing them to be performed up to the higher failure point clock frequency (F2).

Referring again to FIG. 2, a second different approach, according to some embodiments, is shown generally at second cloud 247. With this second approach, in some embodiments, instructions of the second type may be performed up to a higher maximum clock frequency (F2,max), at least at times when instructions of the first type are not being performed (or possibly an acceptably small number of such instructions of the first type are being performed). Further, with this second approach, instructions of the first type (and potentially instructions of the second type if being performed concurrently) may be performed up to a lower maximum clock frequency (F1,max). With this second approach, at times when instructions of the first type are not being performed, there may be no need to limit the maximum clock frequency at which instructions of the second type are performed based on the lower failure point clock frequency (F1) corresponding to instructions of the first type. Rather, the instructions of the second type may be performed up to a higher maximum clock frequency (F2,max), which is decoupled from and/or independent of the lower failure point clock frequency (F1) corresponding to instructions of the first type. The maximum clock frequency used for types of instructions with higher failure points does not need to be limited by lower failure point(s) of other types of instructions. In other words, F2,max may be significantly higher than F1 and/or F12,max. As shown, F2,max may optionally be more proximate the higher failure point clock frequency (F2), as opposed to being more proximate the lower failure point clock frequency (F1) as was the case for F12,max in the first approach described above. Advantageously, this may help to improve performance at times when instructions of the second type are being performed, but instructions of the first type are not being performed (or possibly an acceptably small number of instructions of the first type are being performed).

Also, in some embodiments, with the second approach 247, when instructions of the first type are detected and/or are to be performed, the maximum clock frequency may be reduced from F2,max down to F1,max, as shown generally by arrow 248. This may be performed in real time, during runtime, while instructions are processed by the processor, and without needing a reboot. As shown, in one aspect F1,max may optionally be proximate the lower failure point clock frequency (F1) corresponding to instructions of the first type. Advantageously, this may help to provide a lower failure rate/level when instructions of the first type are to be performed, which may help to reduce system crashes, improve user experience, and the like. Also, the clock frequency may be selectively lowered only when needed (e.g., only at times when instructions of the first type are to be performed), and may otherwise remain higher to achieve better performance. Another possible advantage of the second approach is that higher guaranteed or rated frequencies may optionally be chosen for the processor when performing instructions not of the first type (e.g., when not running instructions that have lower failure point frequencies), and when instructions of the first type (e.g., that have lower failure point frequencies) are to be performed the maximum frequency may be reduced to reduce failure rates.

Figure 3:
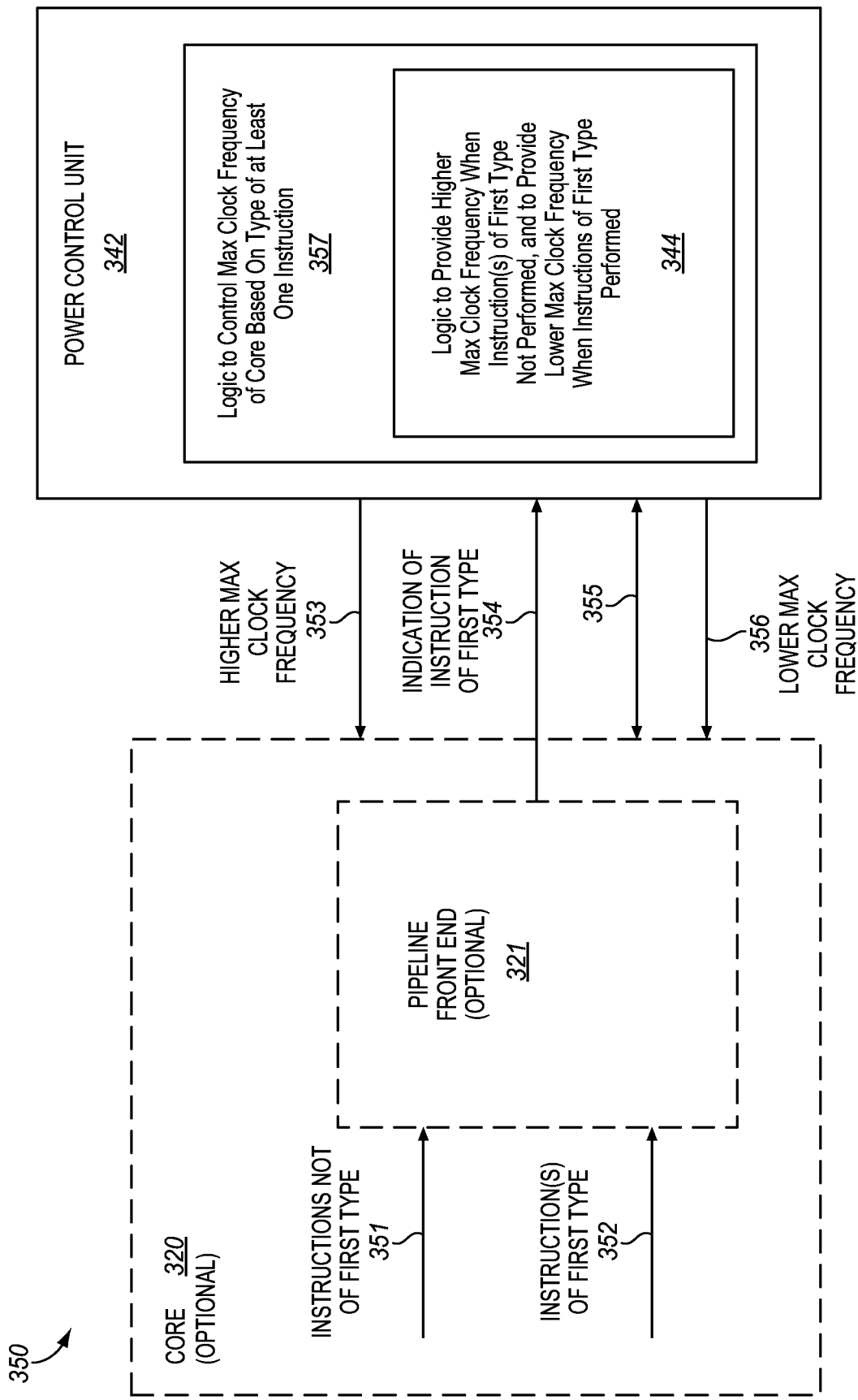
FIG. 3 is a block diagram of an embodiment of an apparatus including a core and a power control unit coupled with the core.

FIG. 3 is a block diagram of an embodiment of an apparatus 350 including a core 320 and a power control unit 342 coupled with the core. In some embodiments, the apparatus 350 may be included in the computer system 100 and/or the processor 101 of FIG. 1. Alternatively, the apparatus 350 may be included in a similar or different computer system and/or processor. Moreover, the computer system 100 and/or the processor 101 of FIG. 1 may have either the same, similar, or different type of core and power control unit as that show in FIG. 3.

In some embodiments the power control unit may be included on the same die or chip as the core(s), for example, both may be included in a same processor and/or on a same system on chip (SoC). In other embodiments the power control unit may be included on a die or chip that is different from a die or chip having the core(s), for example, the cores may be included on a processor and the power control unit may be included on a separate chipset component. In the illustration, the core is shown in dashed lines to indicate that it may or may not be on the same die, chip, or other integrated circuit as the power control unit.

The core 320 may be operative to receive and process various different types of instructions of an instruction set. Any of the previously described types of instructions, or different instructions entirely, are suitable. The core includes a pipeline front end 321. The pipeline front end may be the same as, similar to, or different than the previously described pipeline front end 121. A wide variety of different types of pipeline front end designs and configurations known in the art are suitable. The pipeline front end may receive the instructions. As shown, at certain times the pipeline front end may receive instructions that are not of a first type 351, whereas at other times the pipeline front end may receive instructions of a first type 352.

The pipeline front end may be operative, when the instructions of the first type have been detected and/or are to be performed by the core, to provide a signal, communication, or other indication 354, that an instruction of the first type is to be performed, to the power control unit 342. Various different components of the pipeline front end may provide this indication, such as, for example, a decode unit, a pre-decode unit, a special dedicated unit or logic, etc. Also, different embodiments of this indication are possible. As one specific example, the decode unit responsive to decoding an instruction of the first type (e.g., based on its opcode), may signal the power control unit that an instruction of the first type has been decoded and is going to be performed. As another specific example, in the case of an AVX instruction, the core may send a request to the power control unit asking that it be allowed to perform the AVX instruction, the power control unit may analyze available power and/or thermal budgets and decide whether or not to allow the core to perform the AVX instruction and send either an authorization or denial signal to the core. Such a request and authorization may represent a suitable form of such an indication. In still other embodiments, instead of the pipeline front end providing the indication, it may instead potentially be provided as a communication from an instruction emulator, translator, morpher, interpreter, or other instruction conversion module.

The power control unit 342 may control, or at least assist with controlling, frequencies of clock signals provided to the core 320. As shown, the power control unit may include an embodiment of logic 357 to control (e.g., to change) a maximum clock frequency, at which the core is allowed to operate, based at least in part on a type of at least one instruction that has been detected and/or that is to be performed by the core. In some embodiments, the logic 357 may also represent an embodiment of instruction type aware maximum clock frequency control logic suitable for the logic 144 of FIG. 1. In some embodiments, the logic 357 may use instruction type dependent maximum clock frequency controls (e.g., the controls 464 of FIG. 4). In some embodiments, the logic 357 may use instruction type dependent maximum clock frequency controls that are configurable and reconfigurable by software (e.g., optionally using any of the configuration aspects shown and described for FIG. 4 and/or FIG. 8). The logic 357 may be implemented in hardware (e.g., integrated circuitry, transistors or other circuit elements, etc.), firmware (e.g., memory (non-volatile and/or volatile) and microcode, microinstructions, or other lower-level instructions stored therein), software (e.g., higher-level instructions stored in memory), or a combination thereof (e.g., hardware and/or firmware potentially/optionally combined with a lesser amount of software).

In some embodiments, the logic 357 may be operative to control a reduction in the maximum clock frequency for the core to a lower maximum clock frequency when one or more instructions of at least one type have been detected and/or are to be performed. As used herein, the expression "to be performed" is not limited to the instruction being executed by an execution unit, but rather also encompasses the instruction being processed at any of various pipeline stages, and encompasses any one of at least the instruction being fetched and/or decoded and/or stored in an instruction cache and/or stored in an instruction queue and/or stored in a scheduler queue and/or being committed. In some embodiments, the maximum clock frequency may optionally be changed at some point around the time the instruction is decoded and prior to the instruction being actually executed, although this is not required.

As shown, in some embodiments, the logic 357 may optionally include logic 344 to control higher maximum clock frequencies for the core when instructions of the first type have not been detected and/or are not to be performed, and to control lower maximum clock frequencies for the core when instructions of the first type have been detected and/or are to be performed. As shown, at times when the instructions not of the first type 351 are to be performed, the power control unit may provide higher maximum clock frequencies 353 to the core. Alternatively, when the instructions of the first type 352 have been detected and/or are to be performed (e.g., when the core transmits the indication 354), the power control unit may provide lower maximum clock frequencies 356 to the core. Without limitation, the power control unit may optionally correspondingly change (e.g., lower) the voltage when the maximum clock frequencies are changed. A significant stability improvement may be realized in part by the lower voltage and lower temperatures (e.g., which may result from lowering the maximum frequency and/or voltage).

For simplicity in the illustration, only instructions of a first type 352, and instructions not of a first type 351, have been shown. However, in other embodiments, the same concepts can be extended to additional sets of one or more instructions, in which each set is of a different type. For example, two, three, four, or more different types of instructions may each cause an indication analogous to the indication 354, and different corresponding maximum clock frequency reductions. As another example, two, three, four, or more different groups of instructions (e.g., AVX1, AVX2, AVX-512) may each have different corresponding maximum clock frequency reductions and any instruction in any group may cause an indication analogous to the indication 354, the different corresponding frequency reductions. Combinations of single instructions and groups are also possible.

Now, the maximum clock frequencies may not necessarily be the actual operating frequencies at any given time during operation. Rather, the maximum clock frequencies may represent the maximum possible or available clock frequencies at which the core is allowed to operate based on the types of instructions that are currently to be performed. Sometimes the actual operating frequencies may be raised to the maximum clock frequencies, whereas at other times the actual operating frequencies may be lower than the maximum clock frequencies. The actual operating frequencies may be governed or regulated by other algorithms and/or logic, such as, for example, based on Advanced Configuration and Power Interface (ACPI), optionally Intel® Turbo Boost Technology or other forms of dynamic overclocking, etc.

Figure 4:
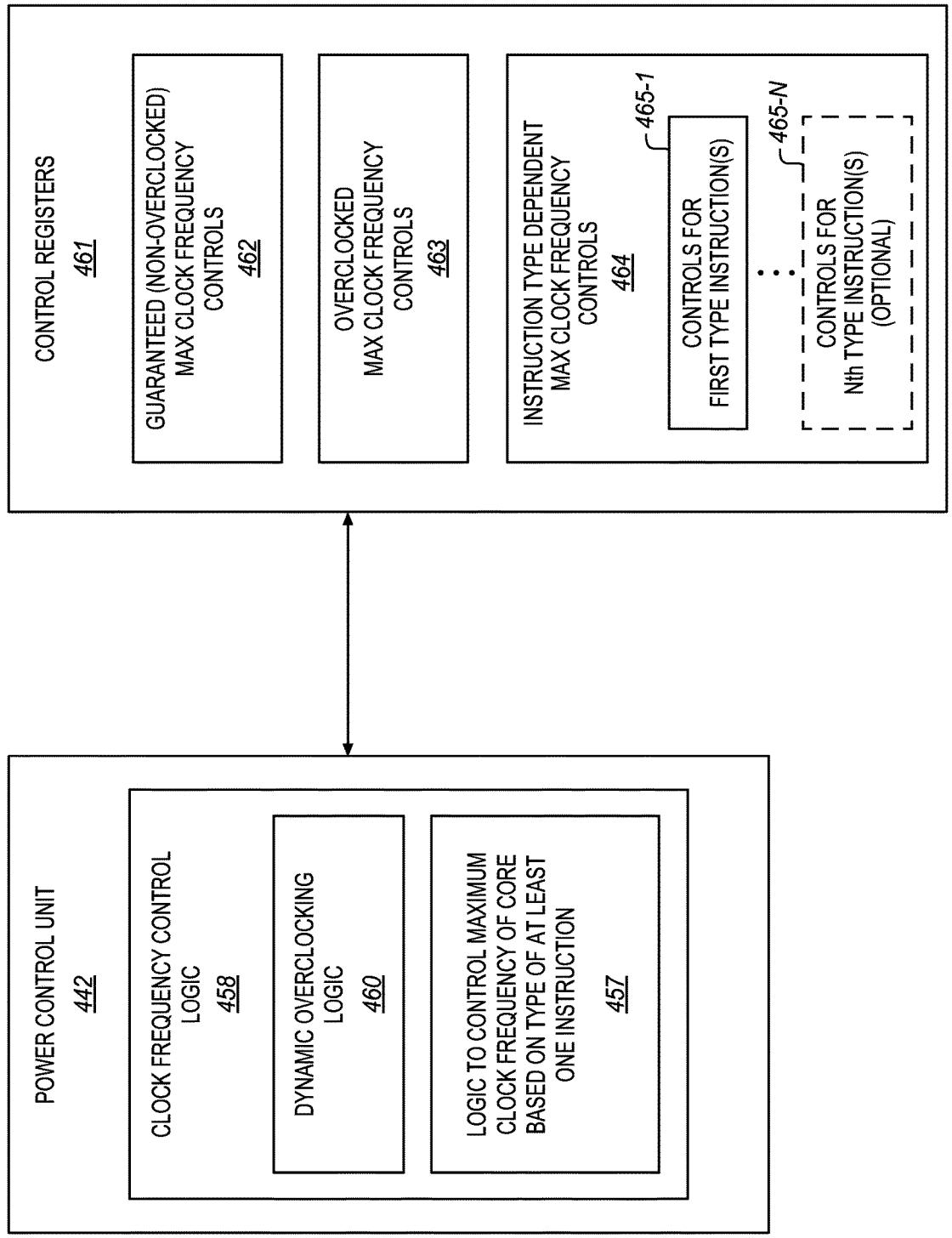
FIG. 4 is a block diagram of an example embodiment of a power control unit and one or more control registers having an example embodiment of various clock frequency controls.

FIG. 4 is a block diagram of an example embodiment of a power control unit 442 and one or more control registers 461 having an example embodiment of various clock frequency controls 462, 463, 464. The power control unit includes clock frequency control logic 458. The clock frequency control logic includes dynamic overclocking logic 460, and logic 457 to control a maximum clock frequency of a core based on a type of at least one instruction. The logic 457 may be implemented in hardware, firmware, software, or a combination thereof. The control registers store one or more guaranteed (e.g., non-overclocked) maximum clock frequency controls 462, one or more overclocked maximum clock frequency controls 463, and instruction type dependent maximum clock frequency controls 464.

The guaranteed maximum clock frequency controls 462 may correspond to a certified, rated, or otherwise guaranteed operational clock rate or frequency according to the manufacturer. In actual operation, the processors may often run at clock frequencies either above or below such guaranteed clock rates. Running the processors at clock frequencies below the guaranteed clock rate is often referred to as "underclocking," and may be used to help conserve power. In contrast, running the processors at clock frequencies above the guaranteed clock rate is often referred to as "overclocking," and may be used to help improve computational speed and performance.

The clock frequency control logic 458 may control clock frequencies based on an ACPI specification. ACPI provides a mechanism to allow an operating system to cause a processor to operate in various performance states or levels. For example, there may be levels P0 through PN. The P1 performance state may correspond to the highest performance state within the guaranteed clock rate, which can be requested by the operating system. In addition to this P1 performance state, some types of processors may allow the operating system to request a higher performance state known as a P0 performance state. The P0 performance state may represent an opportunistic performance state, which is available when certain power, thermal, or other such conditions are satisfied, in which at least a portion of the processor may be configured to operate at a higher clock frequency than the guaranteed clock frequency of the processor. For certain processors, the P0 performance state is sometimes referred to as a turbo state, a turbo mode, or dynamic overclocking mode. The control registers(s) may include one or more overclocked maximum clock frequency controls 463 to be used during such overclocked frequency ranges.

In some embodiments, the clock frequency control logic 458 and/or the power control unit may optionally include dynamic overclocking logic 460 to control clock frequencies while in the P0 performance state (e.g., using the overclocked clock frequency controls 463). As one example, certain processors such as the Intel® Core™ i5 and Intel® Core™ i7 processors available from Intel Corporation, of Santa Clara, Calif., have Intel® Turbo Boost Technology. Turbo Boost Technology, or other dynamic overclocking approaches, may allow the clock frequency to be dynamically increased or overclocked above the guaranteed clock frequency when certain thermal and electrical conditions are met. Turbo Boost Technology may be activated when the operating system requests the highest performance state of the processor. The increased clock rate may be limited by the processor's power, current and thermal limits, as well as the number of cores currently in use, and the maximum frequency of the active cores. When any of the electrical or thermal limits are reached, the operating frequency may automatically decrease until the processor is again operating within its design limits. Other dynamic overclocking approaches may have the same or similar features.

The base clock frequency may be expressed as a product of a base clock rate (e.g., BCLK) and a clock multiplier. For example, with a base clock rate of 133 MHz, and a clock multiplier of ten, the processor may operate at a clock frequency of 1.33 GHz. However, when the processor in a turbo boost state or dynamically overclocked state, the processor may operate above the guaranteed clock frequency, for example in multiples of the base clock rate (e.g., 133 MHz). Accordingly, when the processor is in the turbo boost state or another overclocked state, the actual internal core clock frequency may be described by indicating the integer multiple (e.g., bin upside) above the base clock frequency. A bin upside of "bin+1" may indicate that the processor is operating at one base clock rate above the base clock frequency (e.g., 1.33 GHz+1*133 MHz=1.463 GHz), a bin upside of "bin+2" may indicate that the processor is operating at two base clock rates above the base clock frequency (e.g., 1.33 GHz+2*133 MHz=1.596 GHz), and so on. In a multi-core processor using Turbo Boost Technology, and potentially other dynamic overclocking approaches, the number of active cores at any given instant may also limit the maximum overclocked clock frequency. For example, a four-core processor having only one active core at a given instant may be able to operate at a higher turbo mode than when all four cores are active (e.g., not in the C6 or C7 ACPI power consumption states). Active cores may draw power and affect the other cores. As one specific illustrative example of the overclocked maximum clock frequency controls 463, a four-core processor may have ratios or multipliers of 1/1/6/9, where the upper turbo mode for all four cores being active is "bin+1", the upper turbo mode for only three cores being active is also "bin+1", the upper turbo mode for only two cores being active is "bin+6", and the upper turbo mode for only one core being active is "bin+9". In processors with Intel® Turbo Boost Technology these ratios or multipliers, representing one example of suitable overclocked maximum clock frequency controls 463, are referred to as turbo ratio limits to indicate the maximum ratios and/or maximum clock frequencies allowed in turbo mode. Other overclocking approaches may similarly use ratios or multipliers as clock frequency controls or limits.

In some embodiments, the logic 457 may control the maximum clock frequency of a core based on a type of at least one instruction, using the instruction type dependent maximum clock frequency controls 464. As shown, in some embodiments, there may optionally be multiple such controls, for example, a first instruction type dependent maximum clock frequency control 456-1 for a first type of instruction(s) optionally through an Nth instruction type dependent maximum clock frequency control 456-N for an Nth type of instruction(s). In various embodiments, there may be one, two, three, four, five, more than five, or more than ten different instruction type dependent maximum clock frequency controls. In some embodiments, the instruction type dependent maximum clock frequency controls 464, or at least some of them, may be configurable by software. For example, the software may be allowed to configure or reconfigure the controls, in some embodiments during runtime and without needing a system reboot. Advantageously, the ability to configure or reconfigure these controls with software may help to allow the controls to be flexibly configured to different values appropriate for particular implementations and tradeoffs (e.g., risk of failure versus performance tradeoffs). Further, the ability to configure or reconfigure these controls during runtime and without needing a system reboot may help to allow improved tuning or optimization of values and/or to allow the values to be changed for different portions of code running which may have reasons to use different controls (e.g., different thermal loads, etc.).

In some embodiments, these instruction type dependent maximum clock frequency controls 464 may be employed during overclocking, and may be used to modify or further limit the overclocked maximum clock frequency controls 463, although the scope of the invention is not so limited. Commonly, the failure point clock frequencies and/or the regions in which to deliberately reduce the maximum clock frequency, using embodiments described herein, will be located in overclocked frequency regions, although the scope of the invention is not so limited. This is often the case because the guaranteed clock rates are often established to be below the failure point clock frequencies. However, embodiments of the invention are also suitable for use partly in overclocked and partly in non-overclocked frequency ranges, as well as entirely within underclocked frequency ranges, depending on a frequency where at least one instruction of a given type experiences failures that can be reduced by imposing a limit on the maximum clock frequency using the approaches disclosed herein.

To further illustrate, in the case of Turbo Boost Technology, or other approaches in which ratios or multipliers are used, these instruction type dependent maximum clock frequency controls may, in some embodiments, be expressed as ratio offsets or multiplier offsets, which may be subtracted or deducted (e.g., as controlled by the logic 457) from the maximum overclocked ratios or multipliers. As one particular illustrative example, a first ratio offset or reduction may be used for AVX1/AVX2 to indicate how much lower in clock frequency AVX1/AVX2 instructions are allowed to be performed as compared to non-AVX (e.g., SSE) instructions. Optionally, a second ratio offset or reduction may be used for AVX-512 to indicate how much lower in clock frequency AVX-512 instructions are allowed to be performed as compared to non-AVX-512 (e.g., SSE) instructions. Assuming for simplicity of calculation a 100 MHz base clock, if the SSE turbo ratio limit is 50, then SSE instructions may be performed up to a maximum turbo clock frequency of 5.0 GHz (=50*100 MHz). Further, if an AVX1/AVX2 negative offset or ratio reduction of 3 is applied for AVX1/AVX2, then when the system encounters an AVX1 and/or AVX2 instruction the maximum clock frequency (in this case a maximum turbo clock frequency) may be lowered to 4.7 GHz (=(50−3)*100 MHz) and the AVX1/AVX2 instructions may be performed up to this reduced maximum clock frequency. Stated differently, the AVX1/AVX2 negative offset or ratio reduction of 3 will result in AVX1 and/or AVX2 instructions running at most 3*BCLK or 300 MHz (=3*100 MHz) lower than SSE's maximum turbo clock frequency.

In some embodiments, the overclocked maximum clock frequency controls 463 may optionally include a single set of core-agnostic ratios or multipliers (e.g., turbo ratio limits) that may be used for multiple different cores. For example, some cores may be slower than others, and the single set of core-agnostic ratios or multipliers may be determined for by the slower core(s). In such a case, in some embodiments, the instruction type dependent maximum clock frequency controls 464 may similarly include a single set of core-agnostic instruction dependent maximum clock frequency controls (e.g., ratio offsets). In other embodiments, the overclocked maximum clock frequency controls 463 may optionally include different sets of core-dependent ratios or multipliers (e.g., turbo ratio limits) that may be used for different cores. For example, there may be potentially different set of per-core ratios or multipliers (e.g., turbo ratio limits) for each of the different cores. By way of example, some cores may be faster than others, and such per-core ratios or multipliers may be customized or tailored to the capabilities of the individual cores. In such a case, in some embodiments, the instruction type dependent maximum clock frequency controls 464 may similarly include different per-core sets of core-dependent instruction dependent maximum clock frequency controls (e.g., ratio offsets). For example, a first core may have a first set turbo ratio limits and a corresponding first set of AVX1/AVX2 turbo ratio limit offsets and AVX-512 turbo ratio limit offsets, a second core may have a second different set turbo ratio limits and a corresponding second different set of AVX1/AVX2 turbo ratio limit offsets and AVX-512 turbo ratio limit offsets, and so on.

In some embodiments, the same ratio or multiplier offsets may optionally be used regardless of the magnitude of the starting ratio or multiplier that they are deducted or subtracted from. This may, for example, provide a simpler implementation. In other embodiments, if desired the ratio or multiplier offsets may optionally have values that depend on the starting ratio or multiplier that they are deducted or subtracted from (e.g., greater offsets when the starting values are greater to lesser offsets when the starting values are lesser). For example, the offsets may be a fixed percentage or fraction of the starting ratios (e.g., if the starting ratio is 10 and the fraction is 0.1 the offset may be 1, whereas if the starting ratio is 5 and the fraction is 0.1 the offset may be 0.5). In still other embodiments, if desired the same ratio or multiplier offsets may optionally be used, but may only be used when the magnitude of the starting ratio or multiplier that they are deducted or subtracted from is great enough to warrant them (e.g., meets a threshold magnitude). Furthermore, in other embodiments, if desired instead of using ratio or multiplier offsets that need to be subtracted, the instruction type dependent maximum clock frequency controls 464 may instead include absolute instruction type dependent ratios or multipliers that may be applied directly instead of needing to be subtracted. In some embodiments these absolute ratios or multipliers may optionally be configurable (e.g., be stored in a control register and accessible to software). In other embodiments these may optionally be fused or otherwise fixed and non-configurable values (e.g., fixed by the processor or system manufacturer), for example similar to guaranteed ratios. In addition, as previously mentioned, other embodiments are not limited to applying such instruction type dependent maximum clock frequency controls for only overclocked frequency ranges. For example, if desired for the particular implementation, such controls may be used in underclocked ranges, or partly overclocked and partly underclocked ranges (e.g., offsets may be applied to the guaranteed maximum clock frequency controls 462).

Figure 5:
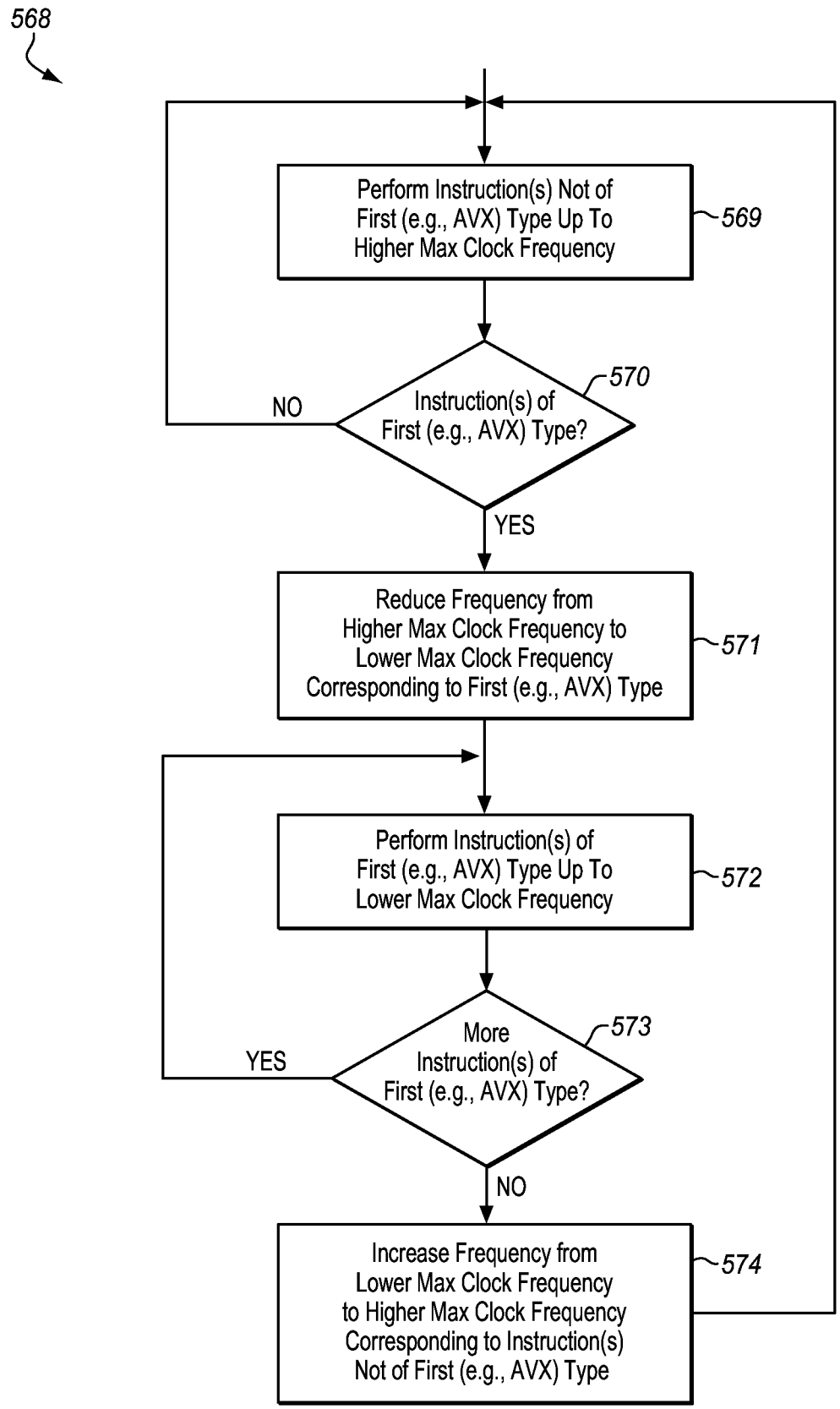
FIG. 5 is a block flow diagram of a first embodiment of a method of controlling maximum clock frequencies in a processor.

FIG. 5 is a block flow diagram of a first embodiment of a method 568 of controlling maximum clock frequencies in a processor. At block 569, the method includes performing instructions that are not of a first type, subject to and/or not above and/or otherwise up to but not exceeding a relatively higher maximum clock frequency. In one particular example embodiment, the instructions of the first type may be AVX instructions (e.g., AVX1, and/or AVX2, and/or AVX-512 instructions), and performing the instructions not of the first type may include performing various MMX, SSE, general-purpose, and other types of instructions, but not AVX type instructions, although the scope of the invention is not so limited.

At block 570, a determination may be made whether or not one or more instructions of the first type have been detected and/or are to be performed. In one particular example embodiment, this may include determining whether or not one or more AVX type instructions have been detected and/or are to be performed, although the scope of the invention is not so limited. If one or more instructions of the first type have not been detected and/or are not to be performed (i.e., "no" is the determination at block 570), the method may revisit block, where additional instructions that are not of a first type may be performed up to the relatively higher maximum clock frequency.

Alternatively, if one or more instructions of the first type have been detected and/or are to be performed (i.e., "yes" is the determination at block 570), the method may advance to block 571. In one particular example embodiment, this may include decoding or otherwise detecting an AVX type of instruction which is to be performed. At block 571, the maximum clock frequency may be reduced, from the relatively higher maximum clock frequency corresponding to the instructions not of the first type, to a relatively lower maximum clock frequency corresponding to the instruction(s) of the first type. Without limitation, the voltage may optionally be correspondingly reduced (e.g., lowered). A significant stability improvement may be realized in part by the lower voltage and lower temperatures (e.g., which may result from lowering the maximum frequency and/or voltage).

At block 572, the instruction(s) of the first type may be performed up to the relatively lower maximum clock frequency. In one particular example embodiment, one or more AVX instructions, or a routine or other portion of AVX code (including other instructions if performed concurrently), may be performed up to the relatively lower maximum clock frequency, although the scope of the invention is not so limited.

At block 573, a determination may be made whether or not more instruction(s) of the first type have been detected and/or are to be performed. If more instruction(s) of the first type have been detected and/or are to be performed (i.e., "yes" is the determination at block 573), the method may revisit block 572, where the additional instructions of the first type may also be performed up to the relatively lower maximum clock frequency.

Alternatively, if no additional instruction(s) of the first type have been detected and/or there are no additional instructions of the first type to be performed (i.e., "no" is the determination at block 573), the method may advance to block 574. At block 574, the maximum clock frequency may be increased, from the relatively lower maximum clock frequency corresponding to the instruction(s) of the first type, back to the relatively higher maximum clock frequency corresponding to the instructions of not of the first type. Without limitation, the voltage may optionally be correspondingly increased. The method may then revisit block 569.

Figure 6:
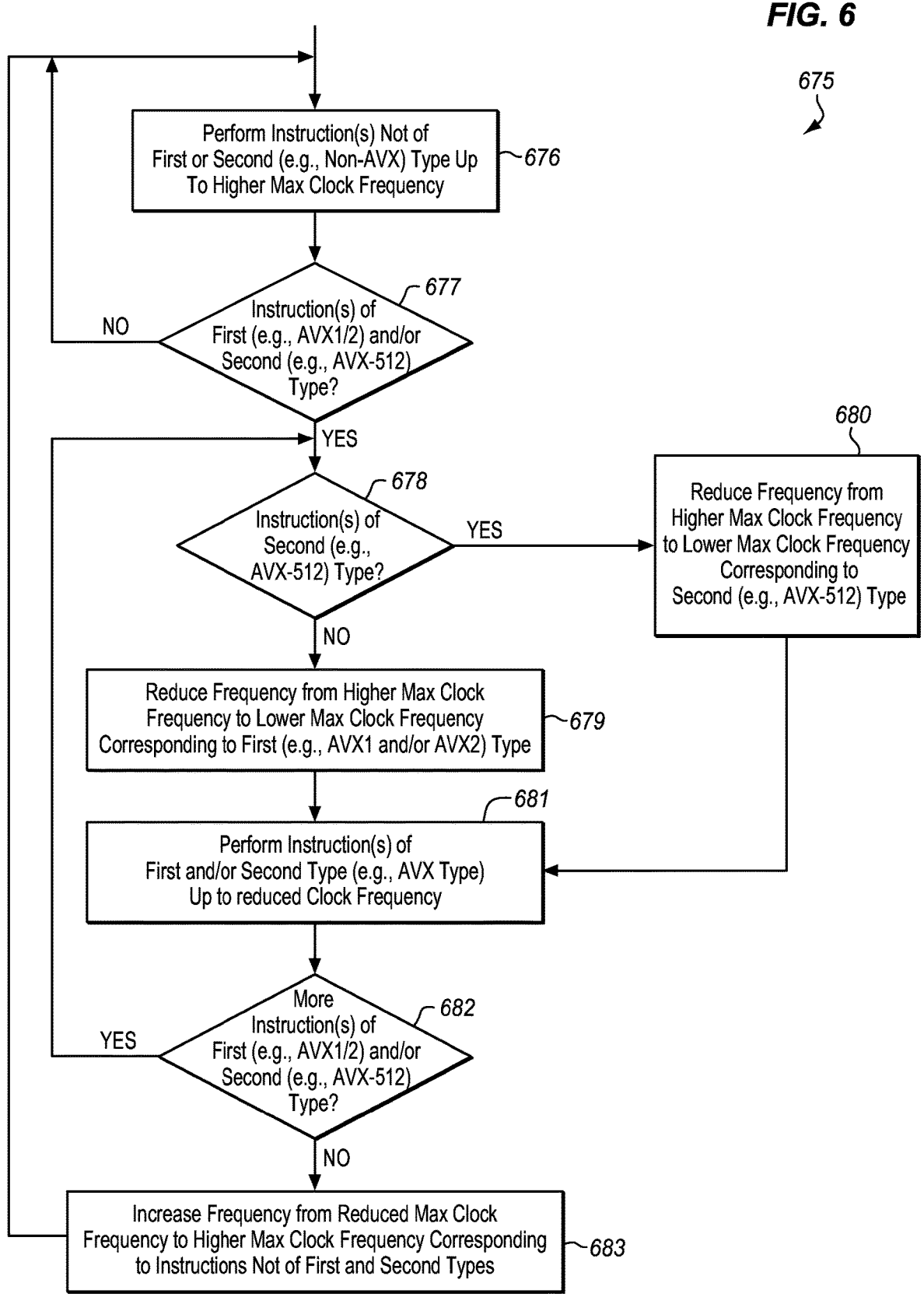
FIG. 6 is a block flow diagram of a second embodiment of a method of controlling maximum clock frequencies in a processor.

FIG. 6 is a block flow diagram of a second embodiment of a method 675 of controlling maximum clock frequencies in a processor. The method of FIG. 6 is similar to the method of FIG. 5, except that it involves first and second types of instructions and two corresponding different reduced maximum clock frequencies.

At block 676, the method includes performing instructions that are neither of a first type nor of a second type, subject to and/or not above and/or otherwise up to but not exceeding a relatively higher maximum clock frequency. In one particular example embodiment, the instructions of the first type may be AVX1 and/or AVX2 instructions, the instructions of the second type may be AVX-512 instructions, and performing the instructions neither of the first type nor of the second type may include performing various MMX, SSE, general-purpose, and other types of instructions, but not AVX type instructions, although the scope of the invention is not so limited.

At block 677, a determination may be made whether or not one or more instructions of the first type and/or the second type have been detected and/or are to be performed. In one particular example embodiment, this may include determining whether or not one or more AVX type instructions have been detected and/or are to be performed, although the scope of the invention is not so limited. If no instructions of the first type or the second type have been detected and/or are to be performed (i.e., "no" is the determination at block 677), the method may revisit block 676, where additional instructions that are neither of the first type nor of the second type may be performed up to the relatively higher maximum clock frequency.

Alternatively, if one or more instructions of the first type and/or the second type have been detected and/or are to be performed (i.e., "yes" is the determination at block 677), the method may advance to block 678. In one particular example embodiment, this may involve decoding or otherwise detecting an AVX1 type instruction, an AVX2 type instruction, an AVX-512 type instruction, or a combination thereof, although the scope of the invention is not so limited.

At block 678, another determination may be made whether or not one or more instructions of the second type have been detected and/or are to be performed. In one particular example embodiment, this may include determining whether or not one or more AVX-512 instructions have been detected and/or are to be performed, although the scope of the invention is not so limited.

If no instructions of the second type have been detected and/or are to be performed (i.e., "no" is the determination at block 678), the method may advance to block 679. At block 679, the maximum clock frequency may be reduced, from the relatively higher maximum clock frequency, to a first relatively lower maximum clock frequency corresponding to the instruction(s) of the first type.

Alternatively, if one or more instructions of the second type have been detected and/or are to be performed (i.e., "yes" is the determination at block 678), the method may advance to block 680. At block 680, the maximum clock frequency may be reduced, from the relatively higher maximum clock frequency, to a second relatively even lower maximum clock frequency corresponding to the instruction(s) of the second type. In some embodiments, the second even lower maximum clock frequency corresponding to the instructions of the second type may be even lower than the first lower maximum clock frequency corresponding to the instructions of the first type. Without limitation, the voltage may optionally be correspondingly changed (e.g., reduced) based on the maximum clock frequency reductions of block 679 or 680. A significant stability improvement may be realized in part by the lower voltage and lower temperatures (e.g., which may result from lowering the maximum frequency and/or voltage).

The method may advance from either block 679 or block 680 to block 681. At block 681, the instruction(s) of the first and/or second types (and potentially other instructions if performed concurrently and/or within the same timeframe) may be performed up to the reduced maximum clock frequency as reduced by either block 679 or 680. This embodiment illustrates an approach where different types of instructions (e.g., AVX1/AVX2 versus AVX-512) may have different maximum frequency reductions. By contrast, with the approach shown in FIG. 5, a single maximum frequency reduction was used for multiple different types of instructions (e.g., AVX1, AVX2, and AVX-512).

At block 682, a determination may be made whether or not more instruction(s) of the first type and/or the second type have been detected and/or are to be performed. If more instruction(s) of the first type and/or the second type have been detected and/or are to be performed (i.e., "yes" is the determination at block 682), the method may revisit block 678.

Alternatively, if no additional instruction(s) of the first type and/or the second type have been detected and/or there are no additional instructions of the first and/or second types to be performed (i.e., "no" is the determination at block 682), the method may advance to block 683. At block 683, the maximum clock frequency may be increased, from the present reduced maximum clock frequency, back to the relatively higher maximum clock frequency corresponding to the instructions that are neither of the first type nor of the second type (e.g., the frequency previously used at block 676). The method may then revisit block 676.

In one particular example embodiment of application of the method of FIG. 6 to SSE, AVX1/AVX2, and AVX-512 instructions, the higher maximum clock frequency at which SSE instructions (and potentially other non-AVX type instructions) may be performed may be around 5000 MHz or more. Then, when AVX1 and/or AVX2 instructions are to be performed, the maximum clock frequency may be reduced by around 100 MHz. When AVX-512 instructions are to be performed, the maximum clock frequency may be reduced by around 100-200 MHz more than for AVX1/AVX2.

The methods of FIGS. 5-6 have been shown and described in a relatively basic form, but operations may optionally be added to and/or removed from the methods. For example, other embodiments may pertain to a novel subset of the operations illustrated. In addition, while the flow diagrams show a particular order of operations according to embodiments, that order is exemplary. Alternate embodiments may perform the operations in different order, combine certain operations, overlap certain operations, etc.

In some embodiments, the methods of FIG. 5 and/or FIG. 6 may be performed by and/or within the processor of FIG. 1 and/or the apparatus FIG. 3. The components, features, and specific optional details described herein for FIG. 1 and/or FIG. 3, also optionally apply to FIG. 5 and/or FIG. 6. Alternatively, the methods of FIG. 5 and/or FIG. 6 may be performed by and/or within a similar or different processor or apparatus. Moreover, the processor of FIG. 1 and/or the apparatus of FIG. 3 may perform methods the same as, similar to, or different than those of FIG. 5 and/or FIG. 6.

Figure 7:
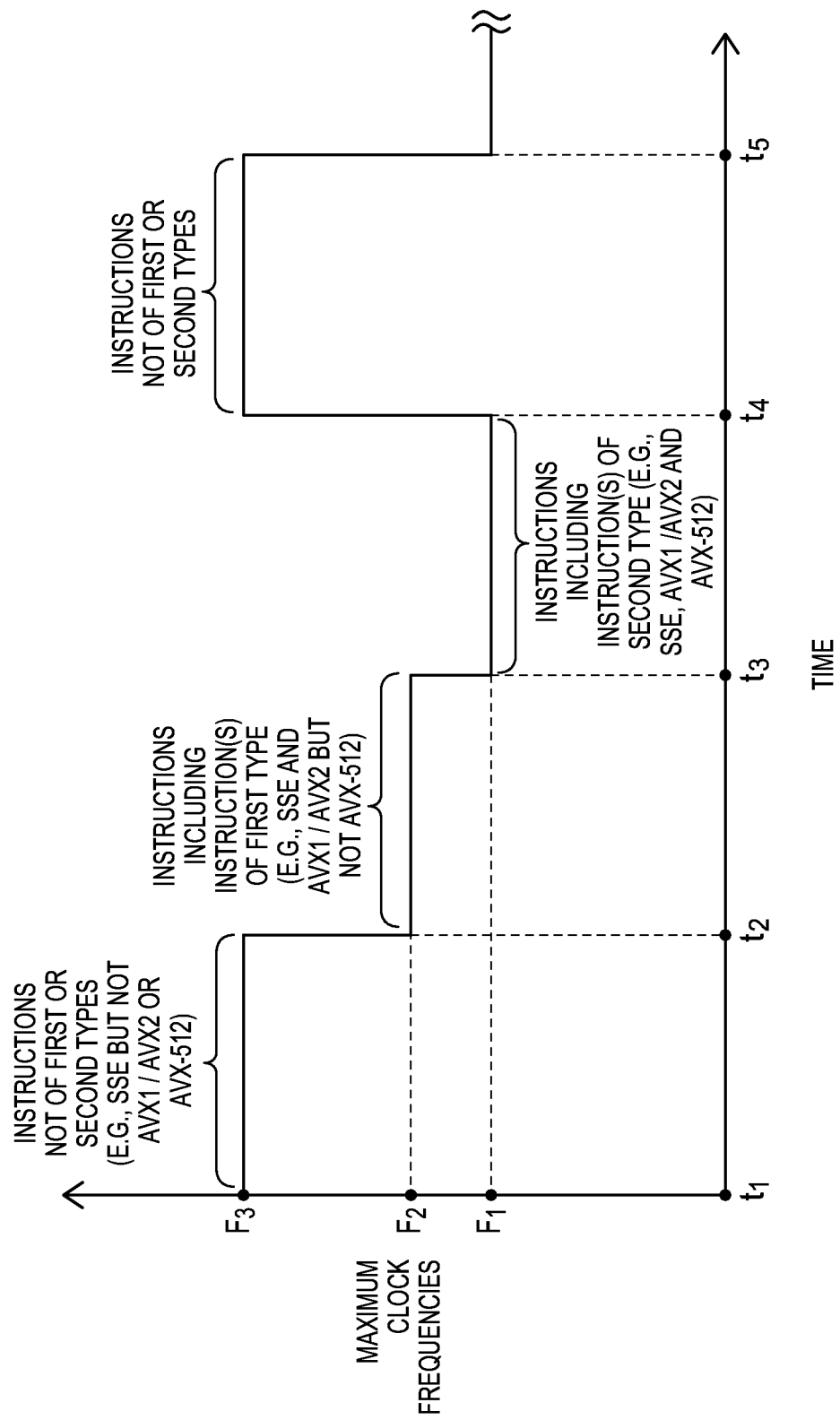
FIG. 7 is a graph illustrating one particular example of a time slice of a workload that shows how maximum clock frequencies may be changed over time.

FIG. 7 is a graph illustrating one particular example of a time slice of a workload that shows how maximum clock frequencies may be changed over time. Time is plotted on a horizontal axis increasing from left to right. Maximum clock frequency is plotted on a vertical axis increasing from bottom to top. In this example, two different levels of maximum clock frequency reductions are shown, although fewer or more levels may optionally be used and each triggered by a different type of instructions.

At time t1, instructions not of a first or a second type may be performed up to a relatively higher maximum clock frequency (F3). At time t2, at least one instruction of a first type is detected and/or is to be performed. The maximum clock frequency is reduced at time t2 from F3 to a first relatively lower maximum clock frequency (F2). Then, the instruction(s) of the first type, and potentially other instructions not of the first or second types if performed concurrently, may be performed up to the frequency F2. At time t3, at least one instruction of a second type is detected and/or is to be performed. The maximum clock frequency is reduced at time t3 from F2 to a second still lower maximum clock frequency (F1). Then, the instruction(s) of the second type, and potentially other instructions if performed concurrently, may be performed up to the frequency F1. At time t4, it is determined that no instructions of the first type or the second type have been detected and/or are to be performed. The maximum clock frequency is increased at time t4 from F1 back to F3. Then, instructions not of the first or second types may be performed at frequencies up to F3. At time t5, at least one instruction of the second type is detected and/or is to be performed. The maximum clock frequency is reduced at time t5 from F3 to F1. Then, the instruction(s) of the second type, and potentially other instructions if performed concurrently, may be performed up to the frequency F1. In various embodiments, the frequencies may either be in overclocked regions, underclocked regions, or span a combination of both. It is to be appreciated that this is just one illustrative example of how a maximum clock frequency may be dynamically changed over time during runtime as different types of instructions are detected and/or performed.

Conventionally, software has had no way to control the maximum clock frequency at which a given type of instruction can be performed. In some embodiments, a processor or other integrated circuit may be operative to allow software configuration of maximum clock frequencies based on instruction type (e.g., configuration after the initial manufacture of the processor and/or after its deployment in a system). For example, the processor or other integrated circuit may allow software configuration and/or reconfiguration of instruction type dependent maximum clock frequency controls. For example, these controls may be exposed to the software and/or accessible to the software. For example, instructions of an instruction set may be able to access (e.g., read and/or write) these controls. In some embodiments, these controls may optionally be configured and/or reconfigured during runtime and without needing to perform a system reboot. In some embodiments, the software that is able to access these controls may be a BIOS, overclocking software, tuning software, an operating system, other privileged software, or the like, or a combination of such different types of software. Advantageously, the ability to configure or reconfigure such controls with software may help to allow the software to flexibly configure the controls to different values. For example, the software may configure the values during runtime at different times based on different types of workloads (e.g., critical not to fail versus ok to fail), different amounts of workloads, different power or thermal loads, or the like. Generally, allowing these controls to be visible to and configurable by software may allow the software to change these controls according to its varied needs and wants. Also, allowing configuration and reconfiguration of these controls may help to allow tuning, performance improvement optimizations, and the like. In one aspect, a designer of a computer system may make a decision about whether such configurability or controls is to be reserved for the computer system designer (e.g., fixed at time of manufacture), a BIOS vendor (e.g., configurable by the BIOS), or an end user (e.g., an operating system and/or tuning application during runtime).

FIG. 8 is a block diagram of an embodiment of a processor 801 that is operative to allow software to access (e.g., read and/or write) instruction type dependent maximum clock frequency controls 864 in one or more control registers 861. In the illustrated embodiment, the read access is available through a read control register instruction 890, and write access is available through a write control register instruction 891, both of which may be instructions of an instruction set of the processor that may be utilized by software (e.g., generally privileged level software).

The processor includes a decode unit 826. The decode unit may receive and decode the read control register instruction 890 and/or the write control register instruction 891. In some embodiments, these instructions may explicitly specify (e.g., through one or more fields or a set of bits), or otherwise indicate (e.g., implicitly indicate), the instruction type dependent maximum clock frequency controls. For example, a field may specify a particular control register or portion thereof having one or more instruction type dependent maximum clock frequency controls of interest. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level instructions. The decode unit may be implemented using various different mechanisms including, but not limited to, microcode read only memories (ROMs), look-up tables, hardware implementations, programmable logic arrays (PLAs), and other mechanisms suitable to implement decode units.

An execution unit 828 is coupled with the decode unit 826. The execution unit may receive the one or more decoded or otherwise converted instructions or control signals that represent and/or are derived from the instructions. The execution unit is operative in response to and/or as a result of the instructions (e.g., in response to one or more instructions or control signals decoded from the instruction) to access one or more of the instruction type dependent maximum clock frequency controls in the one or more control registers 861. Specifically, the execution unit may perform the read control register instruction to read one or more instruction type dependent maximum clock frequency controls from the control register(s) and store them to a destination location (e.g., an architectural general-purpose register, provide them to a power control unit, etc. The execution unit may perform the write control register instruction to write one or more instruction type dependent maximum clock frequency controls indicated by the instruction to the control register(s). Writing these instruction specified or indicated values may represent software configuration of instruction type dependent maximum clock frequency controls.

The control register(s) may represent architecturally visible registers that are visible to software and/or a programmer and/or are the registers indicated by instructions of the instruction set of the processor to identify operands. In some embodiments, the control register(s) may represent one or more model specific registers (MSRs). In other embodiments, the control register(s) may represent virtual registers. For example, in some embodiments, the control register(s) may represent a so-called mailbox. In other embodiments, the parameter(s) may optionally be stored in memory mapped input/output (MMIO) region.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, outof-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 10B:
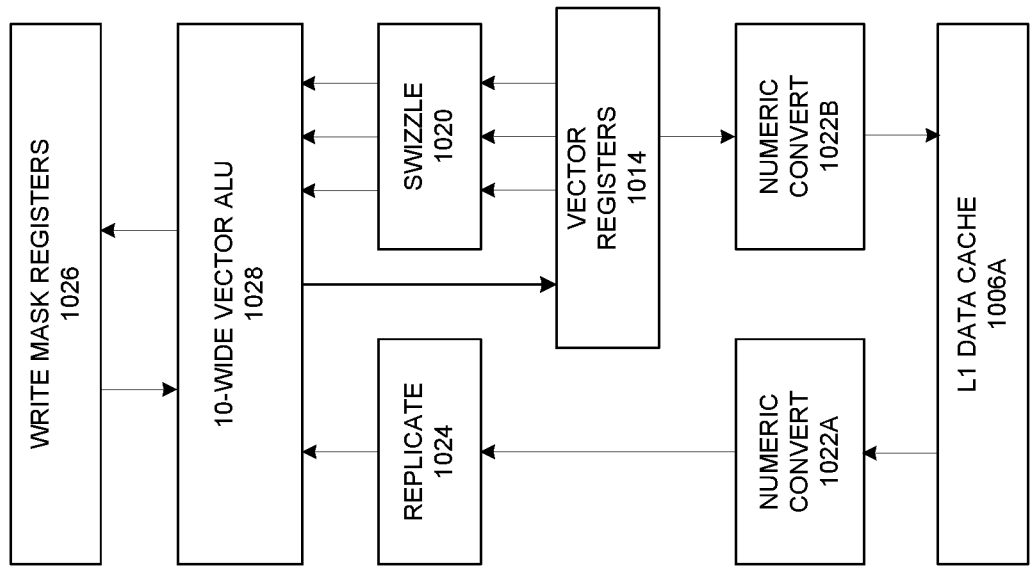
FIG. 10B is a block diagram of an embodiment of an expanded view of part of the processor core of FIG. 10A.
Figure 10A:
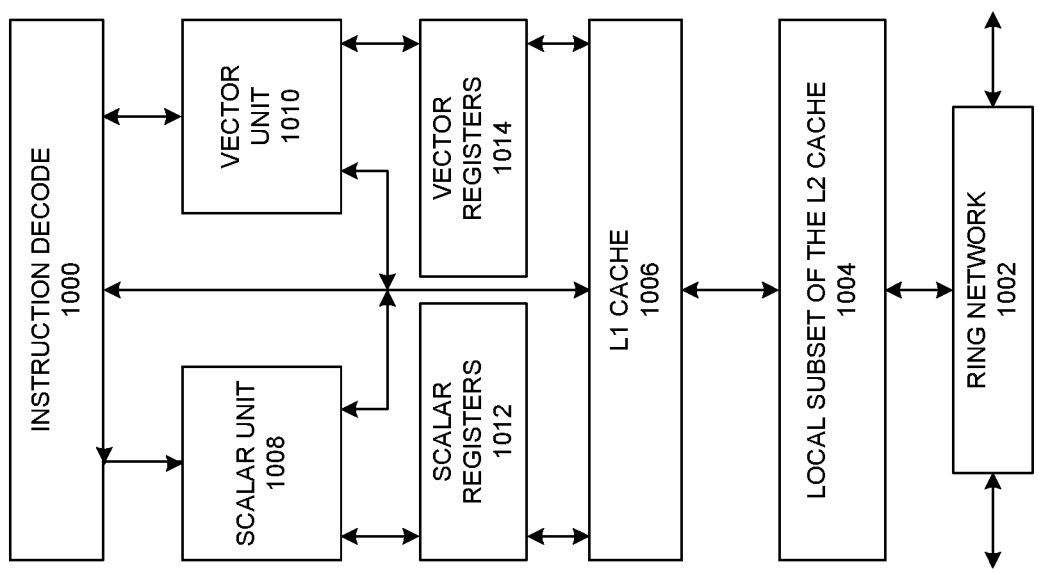
FIG. 10A is a block diagram of an embodiment of a single processor core, along with its connection to the on-die interconnect network, and with its local subset of the Level 2 (L2) cache.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 11012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
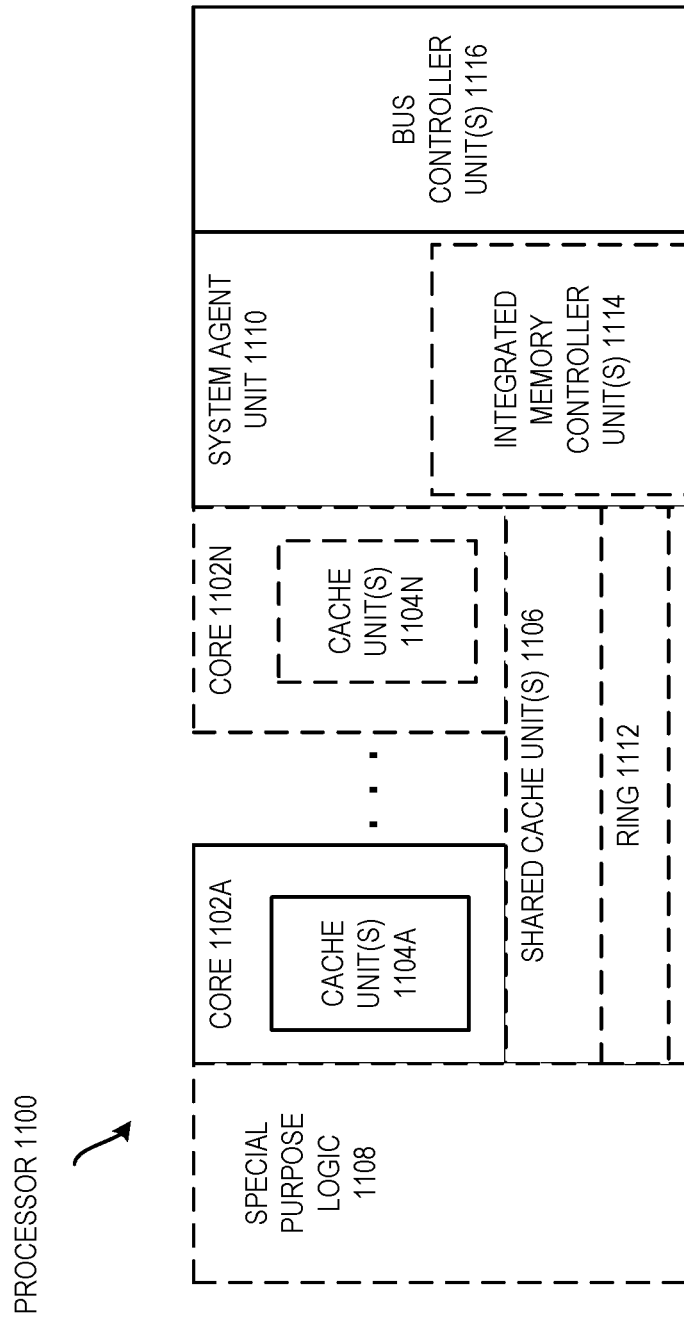
FIG. 11 is a block diagram of an embodiment of a processor that may have more than one core, may have an integrated memory controller, and may have integrated graphics.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
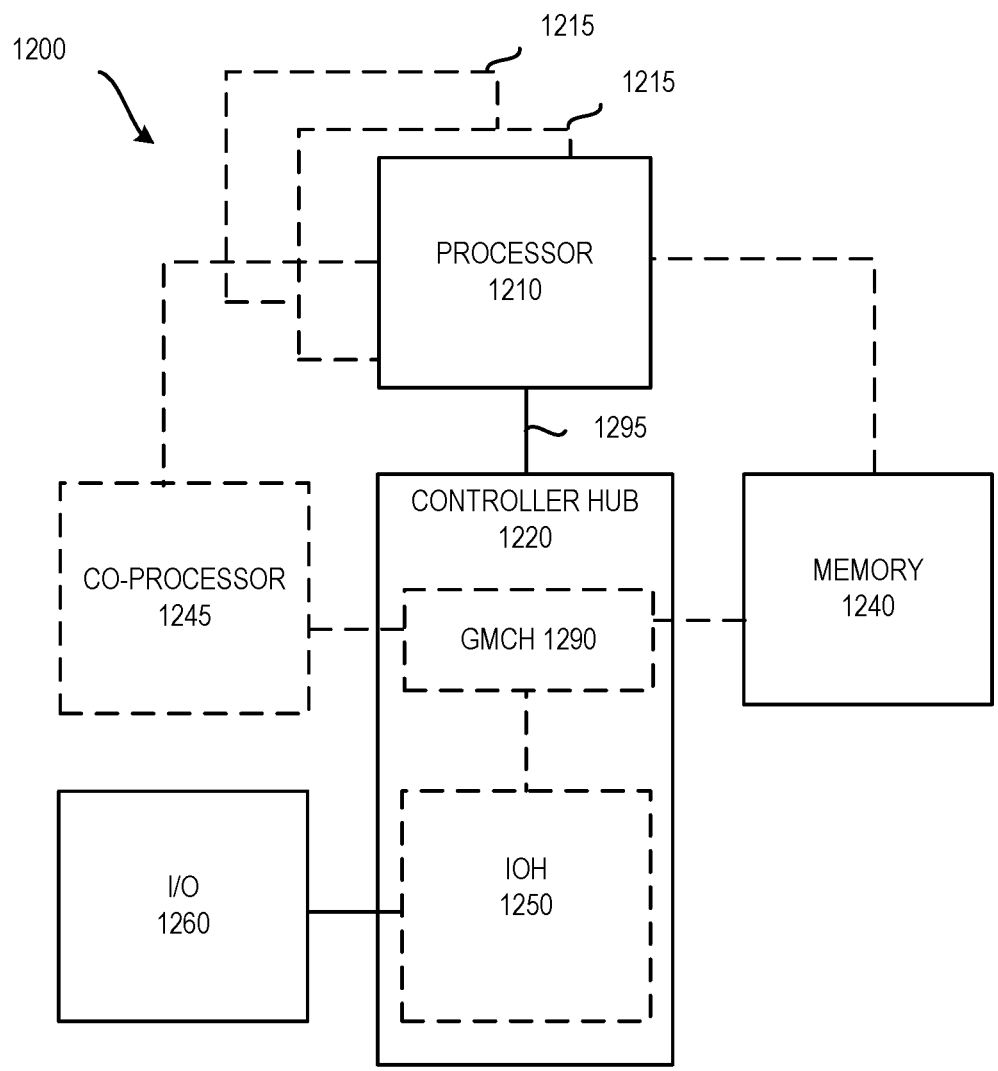
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
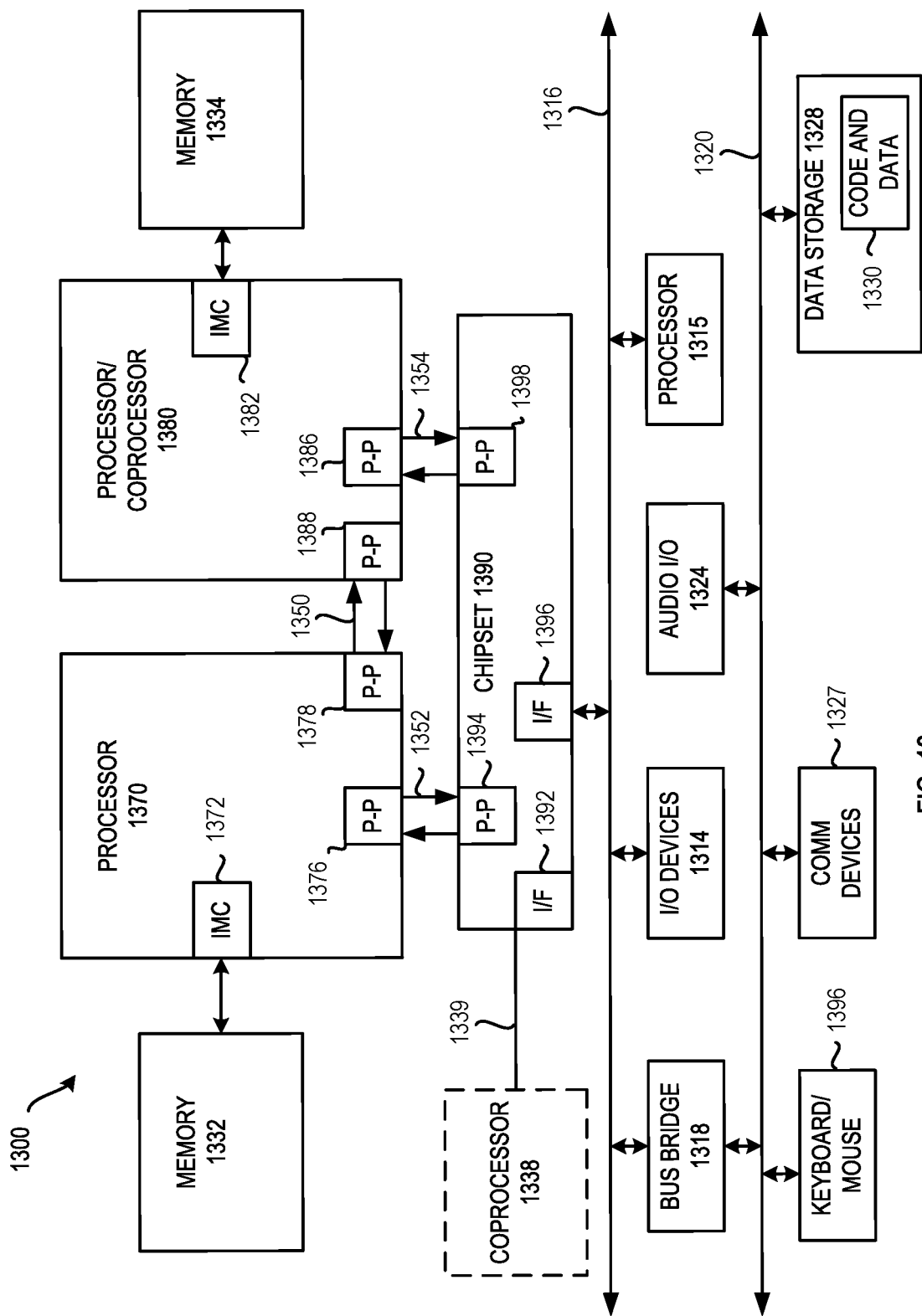
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
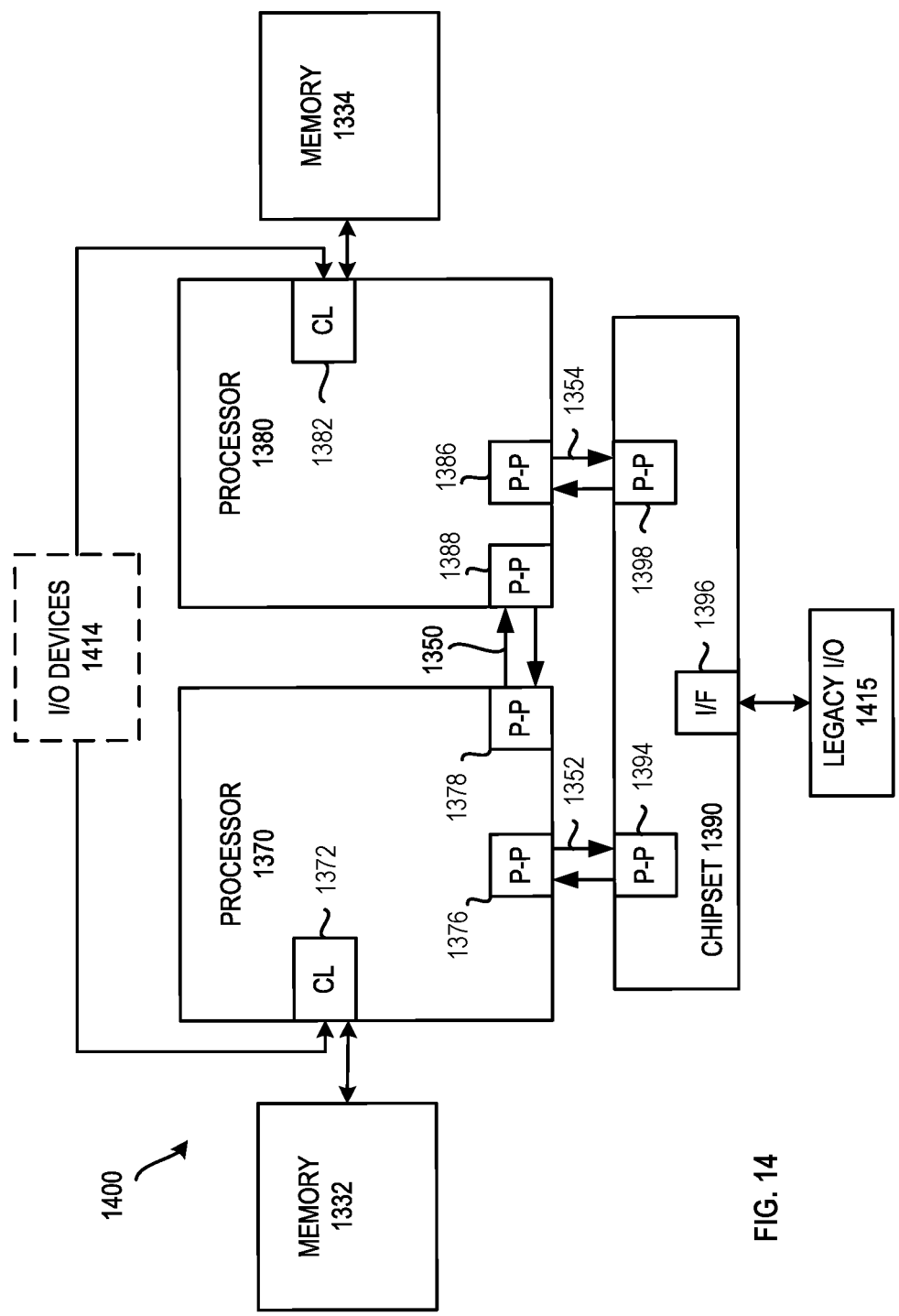
FIG. 14 is a block diagram of a third embodiment of a computer architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
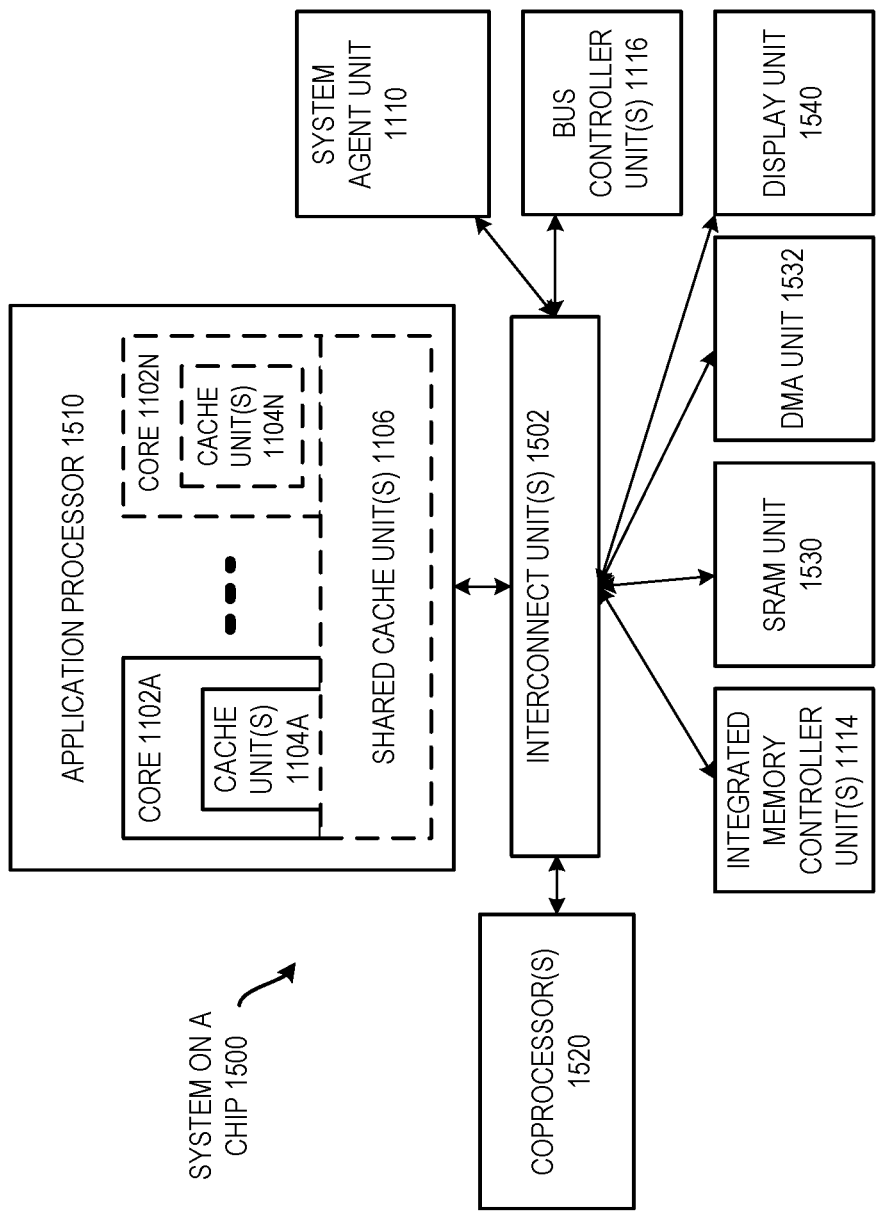
FIG. 15 is a block diagram of a fourth embodiment of a computer architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 142A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
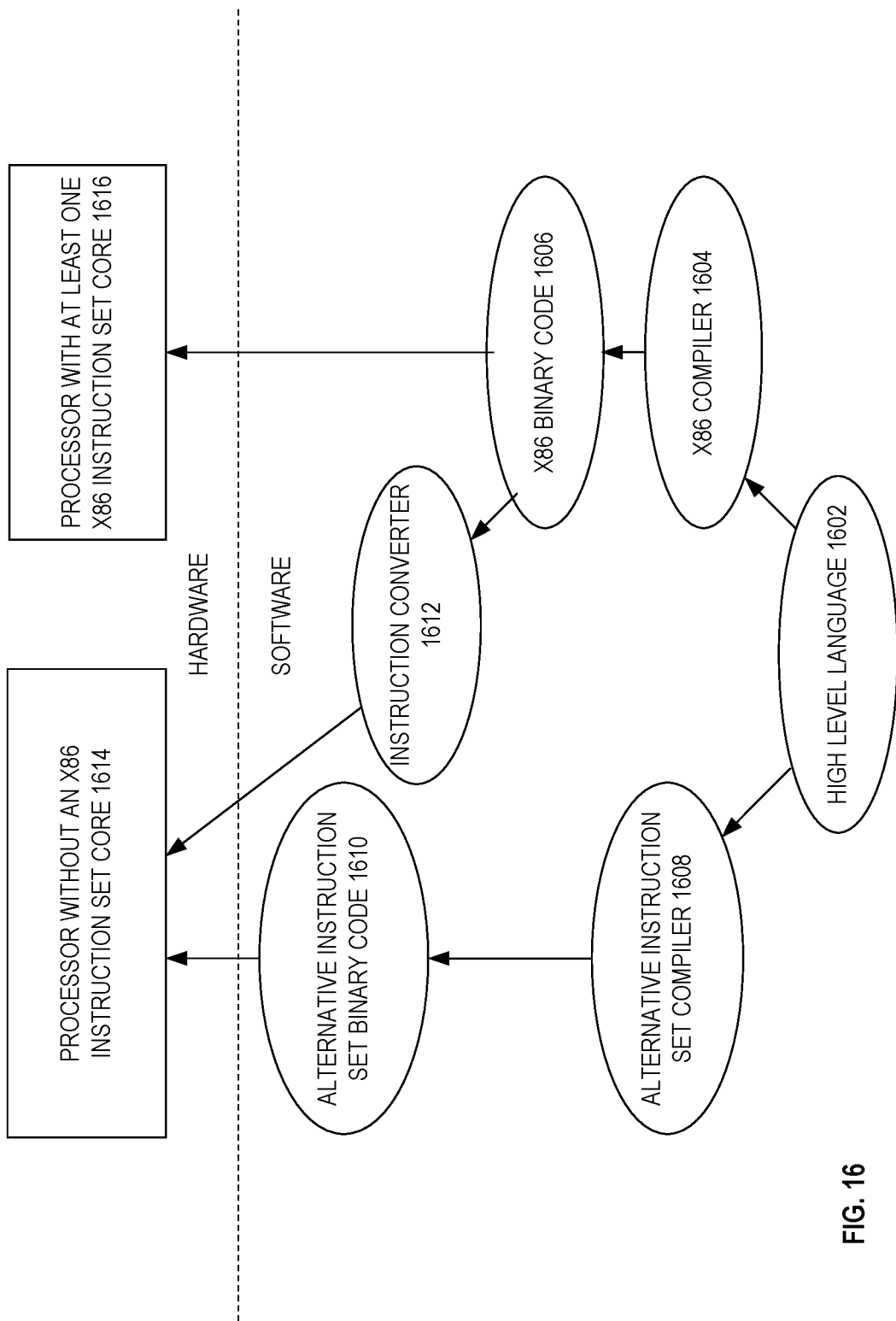
FIG. 16 is a block diagram of use of a software instruction converter to convert binary instructions in a source instruction set to binary instructions in a target instruction set, according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of FIGS. 2, 4, and 8 may also optionally apply to FIG. 3. Components, features, and details described for any of the apparatus disclosed herein (e.g., FIGS. 1, 3, and 4) may optionally apply to any of the methods disclosed herein (e.g., FIGS. 5 and 6), which in embodiments may optionally be performed by and/or with such processors. Any of the apparatus described herein (e.g., 350, 442, 461, 801) in embodiments may optionally be included in any of the systems disclosed herein (e.g., any of the systems of FIGS. 12-14).

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, a power control unit may be coupled with a register and/or a pipeline front end through one or more intervening components. In the figures, arrows are used to show connections and couplings.

The components disclosed herein and the methods depicted in the preceding figures may be implemented with logic, modules, or units that includes hardware (e.g., transistors, gates, circuitry, etc.), firmware (e.g., a non-volatile memory storing microcode or control signals), software (e.g., stored on a non-transitory computer readable storage medium), or a combination thereof. In some embodiments, the logic, modules, or units may include at least some or predominantly a mixture of hardware and/or firmware potentially combined with some optional software.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is an integrated circuit including a power control unit having an interface to receive an indication that one or more instructions of a first type are to be performed by a core. The power control unit also has logic to control a maximum clock frequency for the core based on the indication that the instructions of the first type are to be performed by the core.

Example 2 includes the integrated circuit of Example 1, further including one or more architecturally visible control registers, which are to be writable by at least one instruction of an instruction set. The control register(s) are to store at least one instruction type dependent maximum clock frequency control. The logic is to use the at least one instruction type dependent maximum clock frequency control to control the maximum cock frequency for the core for the instructions of the first type.

Example 3 includes the integrated circuit of any one of Examples 1 to 2, further including a decode unit to decode a write instruction, and an execution unit coupled with the decode unit, the execution unit, in response to the write instruction being decoded, to store at least one instruction type dependent maximum clock frequency control. The logic is to use the at least one instruction type dependent maximum clock frequency control to control the maximum cock frequency for the core for the instructions of the first type.

Example 4 includes the integrated circuit of any one of Examples 1 to 3, in which the logic is to control a higher maximum clock frequency for the core, while other instructions not of the first type are to be performed by the core. The logic is also to control a reduction from the higher maximum clock frequency to a lower maximum clock frequency for the core, responsive to the receipt of the indication.

Example 5 includes the integrated circuit of Example 4, in which the other instructions not of the first type have a higher failure point clock frequency than a lower failure point clock frequency of the instructions of the first type.

Example 6 includes the integrated circuit of Example 5, in which the higher maximum clock frequency is higher than the lower failure point clock frequency of the instructions of the first type. Also, the lower maximum clock frequency is lower than the lower failure point clock frequency of the instructions of the first type.

Example 7 includes the integrated circuit of any one of Examples 4 to 6, in which the other instructions not of the first type are to consume less power on average when performed than an amount of power consumed on average when the instructions of the first type are performed.

Example 8 includes the integrated circuit of any one of Examples 1 to 7, in which the logic is to control a higher maximum clock frequency for the core, while other instructions not of the first type are to be performed by the core. The logic is also to control a reduction from the higher maximum clock frequency to a first lower maximum clock frequency for the core, responsive to the receipt of the indication. The logic is also to control a further reduction from the first lower maximum clock frequency to a second still lower maximum clock frequency for the core, responsive to receipt of a second indication through the interface that one or more instructions of a second different type are to be performed by a core.

Example 9 includes the integrated circuit of Example 8, in which the other instructions not of the first type have a higher failure point clock frequency than a first lower failure point clock frequency of the instructions of the first type. Also, the instructions of the first type optionally have a higher failure point clock frequency than a second still lower failure point clock frequency of the instructions of the second different type.

Example 10 includes the integrated circuit of any one of Examples 8 to 9, in which the other instructions not of the first type are to consume less power on average when performed than an amount of power consumed on average when the instructions of the first type are performed. Also, the instructions of the first type are optionally to consume less power on average when performed than an amount of power consumed on average when the instructions of the second different type are performed.

Example 11 includes the integrated circuit of any one of Examples 1 to 10, in which the logic is to control a higher maximum clock frequency for the core based on an overclocked maximum clock frequency ratio. The logic is also to control a reduction from the higher maximum clock frequency to a lower maximum clock frequency for the core, responsive to the receipt of the indication, by subtracting a ratio offset corresponding to the instructions of the first type from the overclocked maximum clock frequency ratio.

Example 12 includes the integrated circuit of any one of Examples 1 to 11, further including the core, in which the core is coupled with the interface to provide the indication to the interface.

Example 13 is a method in an integrated circuit including receiving an indication that one or more instructions of a first type are to be performed by a core. The method also includes controlling a maximum clock frequency for the core based on the indication that the instructions of the first type are to be performed by the core.

Example 14 includes the method of Example 13, further including configuring with software at least one instruction type dependent maximum clock frequency control that is used in part during the controlling to determine the maximum clock frequency.

Example 15 includes the method of any one of Examples 13 to 14, in which the configuring includes configuring the at least one instruction type dependent maximum clock frequency control with one of a frequency tuning software, an operating system, and an embedded controller. Optionally, the at least one instruction type dependent maximum clock frequency control is configured during runtime and without a need for a system reboot.

Example 16 includes the method of any one of Examples 13 to 15, in which the configuring includes configuring the at least one instruction type dependent maximum clock frequency control with a Basic Input/Output System (BIOS).

Example 17 includes the method of any one of Examples 13 to 16, in which the controlling includes controlling a reduction from a higher maximum clock frequency for the core to a lower maximum clock frequency for the core in response to the receipt of the indication.

Example 18 includes the method of Example 17, in which the lower maximum clock frequency is to be lower than a failure point clock frequency for the instructions of the first type.

Example 19 is a system to process instructions including an interconnect, at least one integrated circuit coupled with the interconnect, and a dynamic random access memory (DRAM) coupled with the interconnect. The at least one integrated circuit having a core and a power control unit. The power control unit having an interface to receive an indication that one or more instructions of a first type are to be performed by a core. The power control unit also having logic to control a maximum clock frequency for the core based on the indication that the instructions of the first type are to be performed by the core. The DRAM is to store a set of instructions that, if performed by the system, are to cause the system to perform operations including configure at least one instruction type dependent maximum clock frequency control that is used in part by the logic to control the maximum clock frequency for the core.

Example 20 includes the system of Example 19, in which the logic is to control a reduction from the maximum clock frequency, which is to be greater than a failure point clock frequency for the instructions of the first type, to a lower maximum clock frequency, which is to be lower than the failure point clock frequency for the instructions of the first type.

Example 21 includes the system of any one of Examples 19 to 20, in which the set of instructions, if performed by the system, are to cause the system to configure the at least one instruction type dependent maximum clock frequency control during runtime, and without a need for a reboot of the system.

Example 22 is an article of manufacture including a non-transitory machine-readable storage medium. The non-transitory machine-readable storage medium storing a set of instructions. The set of instructions, if performed by a machine, to cause the machine to perform operations including store at least one instruction type dependent maximum clock frequency control corresponding to one or more instructions of a first type to an architecturally visible control register of an integrated circuit. The integrated circuit is to use the at least one instruction type dependent maximum clock frequency control to control a maximum clock frequency for a core during execution of the instructions of the first type.

Example 23 includes the article of manufacture of Example 22, in which the set of instructions, if performed by the machine, are to cause the machine to perform operations including store the at least one instruction type dependent maximum clock frequency control to the architecturally visible control register during runtime.

Example 24 includes the article of manufacture of any one of Examples 22 to 23, in which the set of instructions include instructions of one of a Basic Input/Output System (BIOS), an operating system, and frequency tuning software.

Example 25 is a processor or other apparatus operative to perform the method of any one of Examples 13 to 18.

Example 26 is a processor or other apparatus that includes means for performing the method of any one of Examples 13 to 18.

Example 27 is a processor or other apparatus that includes any combination of modules and/or units and/or logic and/or circuitry and/or means operative to perform the method of any one of Examples 13 to 18.

Example 28 is an optionally non-transitory and/or tangible machine-readable medium, which optionally stores or otherwise provides instructions that if and/or when executed by a processor, computer system, electronic device, or other machine, are operative to cause the machine to perform the method of any one of Examples 13 to 18.

Example 29 is a processor or other apparatus substantially as described herein.

Example 30 is a processor or other apparatus that is operative to perform any method substantially as described herein.

What is claimed is:

1. An integrated circuit comprising:
   a power control unit having:
   an interface to receive an indication that one or more instructions of a first type are to be performed by a core, wherein said one or more instructions are instructions of an instruction set of a processor; and
   a circuit to control a reduction from a higher maximum clock frequency for the core, which is to be used to perform at least instructions of a second type but no instructions of the first type, to a lower maximum clock frequency for the core, based on the indication that the instructions of the first type are to be performed by the core, wherein, at the higher maximum clock frequency, a reliability of the core when performing the instructions of the first type is less than a reliability of the core when performing the instructions of the second type, wherein the lower maximum clock frequency is configurable to any of a plurality of different possible lower maximum clock frequencies during runtime by software, and wherein the lower maximum clock frequency is a dynamically overclocked frequency.

2. The integrated circuit of claim 1, further comprising one or more architecturally visible control registers, which are to be writable by at least one instruction of an instruction set, and which are to store at least one instruction type dependent maximum clock frequency control, wherein the circuit is to use the at least one instruction type dependent maximum clock frequency control to control the lower maximum clock frequency for the core for the instructions of the first type.

3. The integrated circuit of claim 1, further comprising:
   a decode circuit to decode a write instruction; and
   an execution circuit coupled with the decode unit, the execution circuit, in response to the write instruction being decoded, to store at least one instruction type dependent maximum clock frequency control,
   wherein the circuit is to use the at least one instruction type dependent maximum clock frequency control to control the maximum cock frequency for the core for the instructions of the first type.

4. The integrated circuit of claim 1, wherein the instructions of the second type have a higher failure point clock frequency than a lower failure point clock frequency of the instructions of the first type.

5. The integrated circuit of claim 4, wherein the higher maximum clock frequency is higher than the lower failure point clock frequency of the instructions of the first type, and wherein the lower maximum clock frequency is lower than the lower failure point clock frequency of the instructions of the first type.

6. The integrated circuit of claim 1, wherein the instructions of the second type are to consume less power on average when performed than an amount of power consumed on average when the instructions of the first type are performed.

7. The integrated circuit of claim 1, wherein the circuit is to:
control the reduction from the higher maximum clock frequency to a first lower maximum clock frequency for the core, responsive to the receipt of the indication; and
control a further reduction from the first lower maximum clock frequency to a second still lower maximum clock frequency for the core, responsive to receipt of a second indication through the interface that one or more instructions of a third different type are to be performed by a core.

8. The integrated circuit of claim 7, wherein said instructions of the second type have a higher failure point clock frequency than a first lower failure point clock frequency of the instructions of the first type, and wherein said instructions of the first type have a higher failure point clock frequency than a second still lower failure point clock frequency of the instructions of the third different type.

9. The integrated circuit of claim 7, wherein said instructions of the second type are to consume less power on average when performed than an amount of power consumed on average when the instructions of the first type are performed, and wherein the instructions of the first type are to consume less power on average when performed than an amount of power consumed on average when the instructions of the third different type are performed.

10. The integrated circuit of claim 1, wherein the circuit is to:
control the higher maximum clock frequency for the core based on an overclocked maximum clock frequency ratio; and
control the reduction from the higher maximum clock frequency to the lower maximum clock frequency for the core, responsive to the receipt of the indication, by subtracting a ratio offset corresponding to the instructions of the first type from the overclocked maximum clock frequency ratio.

11. The integrated circuit of claim 1, further comprising the core, wherein the core is coupled with the interface to provide the indication to the interface.

12. A method in an integrated circuit comprising:
performing instructions of at least a second type, but no instructions of a first type, with a core, at a higher maximum clock frequency;
receiving an indication that one or more instructions of the first type are to be performed by the core, wherein said one or more instructions are instructions of an instruction set of a processor;
sending a request to a power control unit asking for permission to perform the one or more instructions of the first type;
receiving an authorization from the power control unit to perform the one or more instructions of the first type; and controlling a reduction from the higher maximum clock frequency for the core, to a lower maximum clock frequency for the core, based on the indication that the instructions of the first type are to be performed by the core, wherein, at the higher maximum clock frequency, a reliability of the core when performing the instructions of the first type is less than a reliability of the core when performing the instructions of the second type, wherein the lower maximum clock frequency is a dynamically overclocked frequency.

13. The method of claim 12, further comprising configuring with software at least one instruction type dependent maximum clock frequency control that is used in part during said controlling to determine the maximum clock frequency.

14. The method of claim 13, wherein said configuring comprises configuring the at least one instruction type dependent maximum clock frequency control with one of a frequency tuning software, an operating system, and an embedded controller, and wherein the at least one instruction type dependent maximum clock frequency control is configured during runtime and without a need for a system reboot.

15. The method of claim 13, wherein said configuring comprises configuring the at least one instruction type dependent maximum clock frequency control with a Basic Input/Output System (BIOS).

16. The method of claim 13, wherein the lower maximum clock frequency is to be lower than a failure point clock frequency for the instructions of the first type.

17. A system to process instructions comprising:
an interconnect;
at least one integrated circuit coupled with the interconnect, the at least one integrated circuit having a core and a power control unit, the power control unit having:
an interface to receive an indication that one or more instructions of a first type are to be performed by a core, wherein said one or more instructions are instructions of an instruction set of a processor; and
a circuit to control a reduction from a higher maximum clock frequency for the core, which is to be used to perform at least instructions of a second type but no instructions of the first type, to a lower maximum clock frequency for the core, based on the indication that the instructions of the first type are to be performed by the core, wherein, at the higher maximum clock frequency, a reliability of the core when performing the instructions of the first type is less than a reliability of the core when performing the instructions of the second type, wherein the lower maximum clock frequency is a dynamically overclocked frequency; and
a dynamic random access memory (DRAM) coupled with the interconnect, the DRAM storing a set of instructions that, if performed by the system, are to cause the system to perform operations comprising:
configure during runtime by software at least one instruction type dependent maximum clock frequency control that is used in part by the circuit to control the lower maximum clock frequency for the core to any of a plurality of different possible lower maximum clock frequencies.

18. The system of claim 17, wherein the higher maximum clock frequency is to be greater than a failure point clock frequency for the instructions of the first type, and the lower maximum clock frequency is to be lower than the failure point clock frequency for the instructions of the first type.

19. The system of claim 17, wherein the set of instructions, if performed by the system, are to cause the system to configure the at least one instruction type dependent maximum clock frequency control during runtime, and without a need for a reboot of the system.

20. An article of manufacture comprising a non-transitory machine-readable storage medium, the non-transitory machine-readable storage medium storing a set of instructions, the set of instructions, if performed by a machine, to cause the machine to perform operations comprising to:

store at least one instruction type dependent maximum clock frequency control corresponding to one or more instructions of a first type to an architecturally visible control register of an integrated circuit, wherein said one or more instructions of the first type are instructions of an instruction set of a processor, and wherein the integrated circuit is to use the at least one instruction type dependent maximum clock frequency control to control a maximum clock frequency for a core during execution of the instructions of the first type, wherein the maximum clock frequency is a dynamic overclocked frequency; and change, during runtime, the at least one instruction type dependent maximum clock frequency control based at least in part on a tradeoff between reliability and performance.

21. The article of manufacture of claim 20, wherein the set of instructions, if performed by the machine, are to cause the machine to perform operations comprising:

store the at least one instruction type dependent maximum clock frequency control to the architecturally visible control register during runtime.

22. The article of manufacture of claim 20, wherein the set of instructions include instructions of one of a Basic Input/Output System (BIOS), an operating system, and frequency tuning software.

23. The article of manufacture of claim 20, wherein the set of instructions include instructions of frequency tuning software.

24. A processor comprising:

a first core to provide an indication of whether instructions of a first type are to be performed by the first core, wherein the instructions of the first type are instructions of an instruction set of the processor;

a second core; and a power control unit coupled with the first and second cores, the power control unit comprising:

a first circuit to control a higher maximum clock frequency for the first core when the indication is that the instructions of the first type are not to be performed by the first core but instructions of at least a second type are to be performed; and a second circuit to control a reduction from the higher maximum clock frequency to a lower maximum clock frequency for the first core, based on at least one instruction type dependent maximum clock frequency control for the first core, when the indication is that the instructions of the first type are to be performed by the first core, wherein the instructions of the second type have a higher failure point clock frequency than the instructions of the first type, and wherein the at least one instruction type dependent maximum clock frequency control for the first core is distinct from, and capable of being configured by software to have a different value than, at least one instruction type dependent maximum clock frequency control for the second core.

* * * * *